United States Patent
Yoshikawa

Patent Number: 6,132,116
Date of Patent: Oct. 17, 2000

[54] PRINT SYSTEM AND METHOD FOR PRESENTING REQUIRED RECORD TIME OF PRINT SYSTEM

[75] Inventor: Naohiro Yoshikawa, Yokohama, Japan

[73] Assignee: Canon Kabushiki Kaisha, Tokyo, Japan

[21] Appl. No.: 08/489,373

[22] Filed: Jun. 12, 1995

[30] Foreign Application Priority Data

Jun. 14, 1994 [JP] Japan .................................. 6-132184
May 31, 1995 [JP] Japan .................................. 7-133729

[51] Int. Cl.[7] ...................................................... B41J 3/42
[52] U.S. Cl. .............................. 400/71; 101/483; 395/114
[58] Field of Search ................................. 400/61, 70, 71, 400/76; 395/114, 497.02; 101/483

[56] References Cited

U.S. PATENT DOCUMENTS

| | | | |
|---|---|---|---|
| 4,689,743 | 8/1987 | Chio ........................................ | 400/110 |
| 5,043,749 | 8/1991 | Punater et al. ........................... | 101/483 |
| 5,293,463 | 3/1994 | Masuda ................................... | 395/113 |
| 5,493,408 | 2/1996 | Kurogane et al. ....................... | 395/114 |

FOREIGN PATENT DOCUMENTS

| | | | |
|---|---|---|---|
| 0558804 | 9/1993 | European Pat. Off. ................ | 400/71 |
| 0578262 | 1/1994 | European Pat. Off. ................ | 400/71 |
| WO 94/11805 | 5/1994 | WIPO ..................................... | 400/71 |

*Primary Examiner*—Eugene Eickholt
*Attorney, Agent, or Firm*—Fitzpatrick, Cella, Harper and Scinto

[57] ABSTRACT

A print system having a plurality of printers and a plurality of host computers connected to permit communication on a network, comprises a quantifying unit provided in each of the host computers for analyzing print data to be printed to quantify the print data to an index indicating complexity, a transmission unit provided in each of the host computers for adding the index quantified by the quantifying unit to the print data and transmitting the print data to one of the printers through the network, an operation unit provided in each of the printers for converting the index added to the print data transmitted from the transmission unit to a required record time based on a pre-registered conversion value, and a presentation unit provided in each of the printers for presenting the required record time converted by the operation unit.

108 Claims, 11 Drawing Sheets

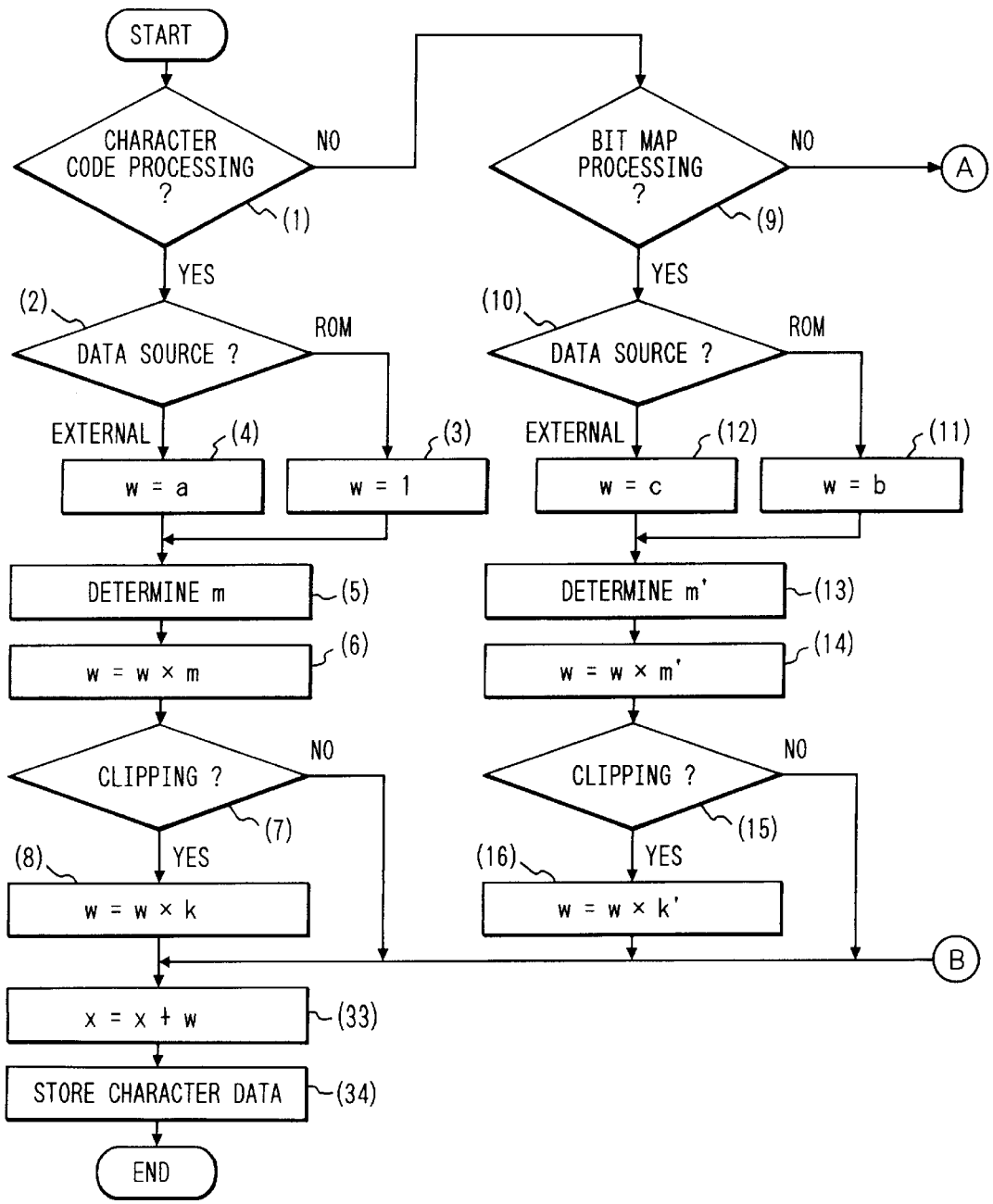

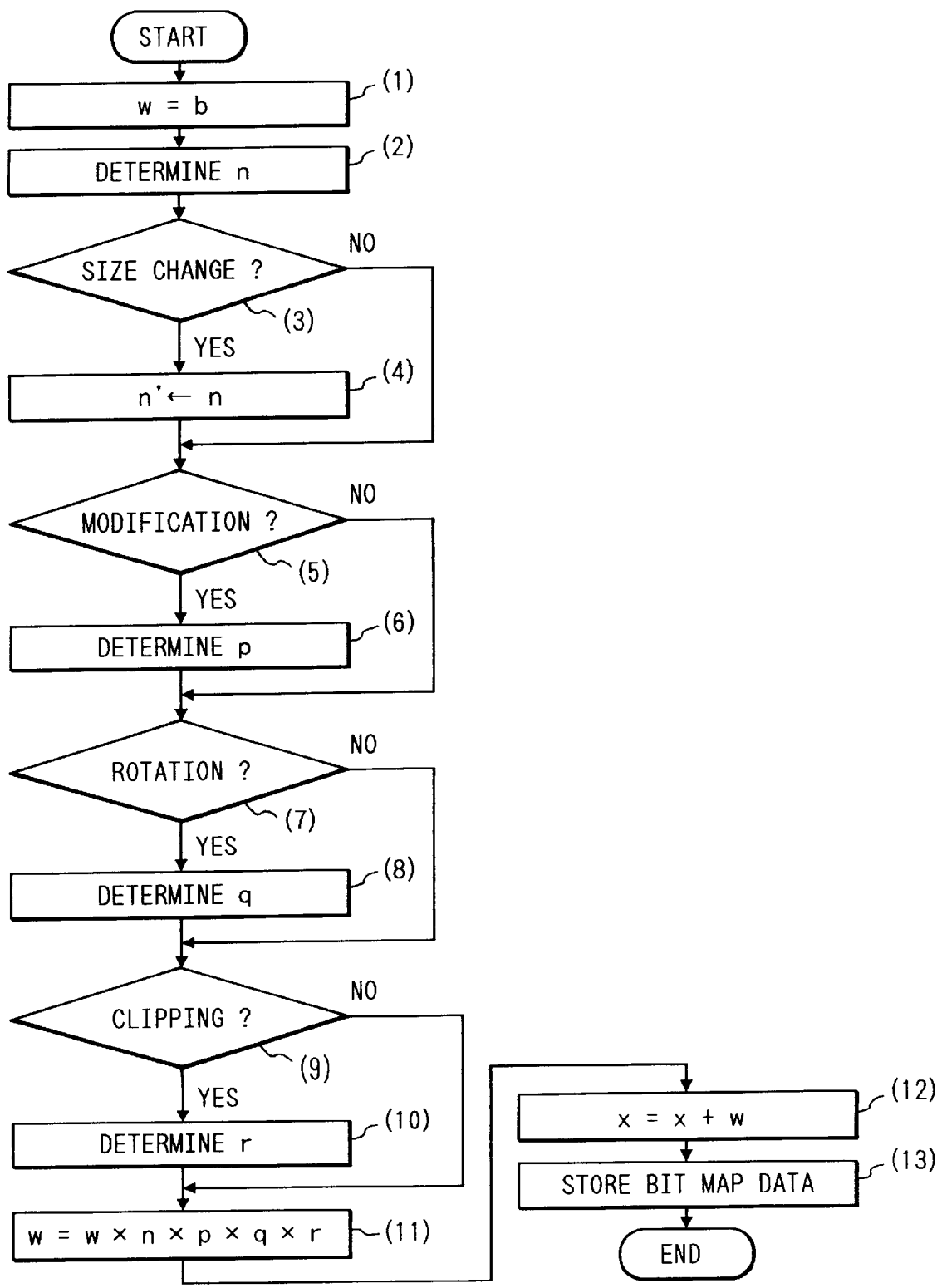

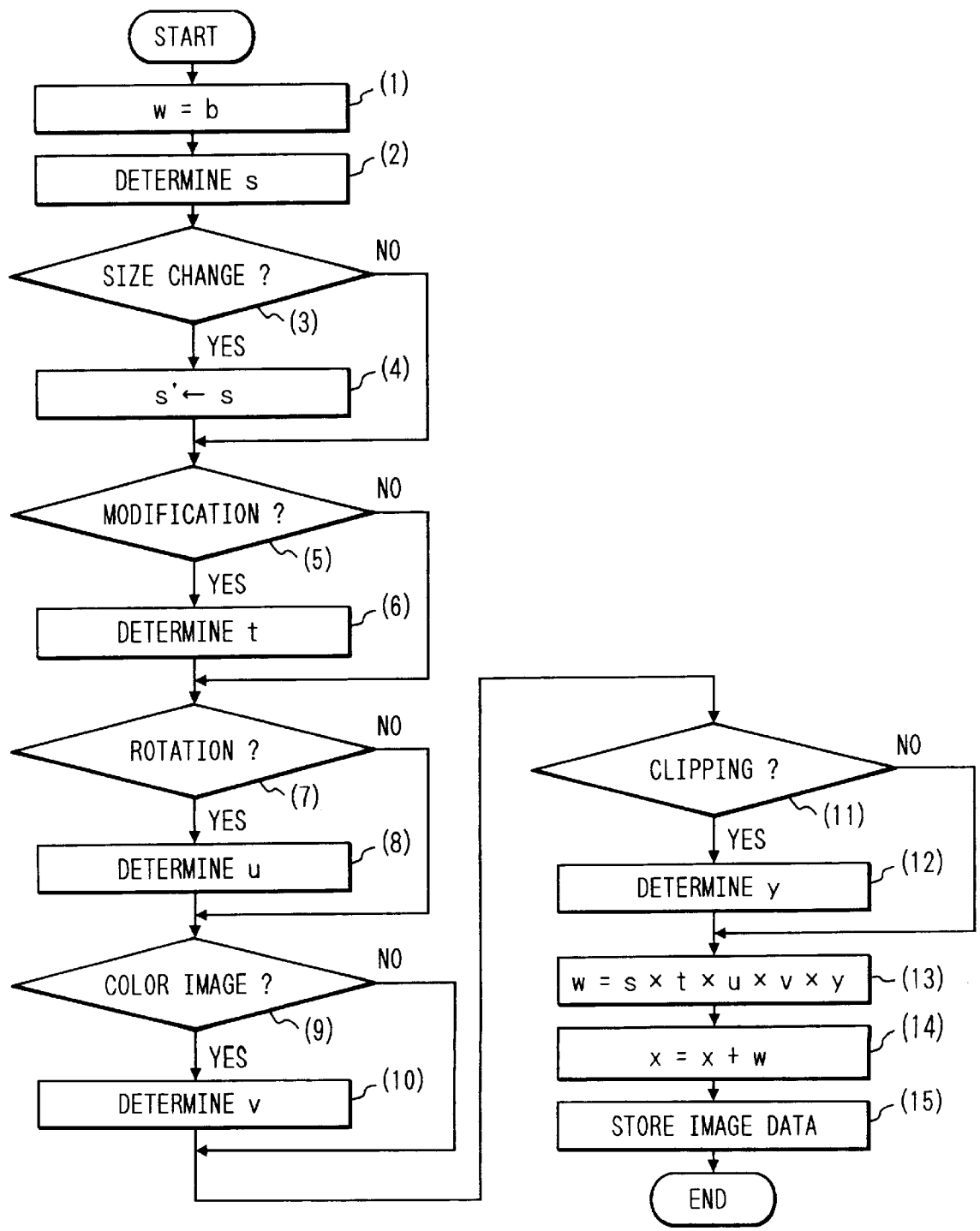

PRINT SYSTEM AND METHOD FOR PRESENTING REQUIRED RECORD TIME OF PRINT SYSTEM

BACKGROUND OF THE INVENTION

1. Field of the Invention

The present invention relates to a print system having a plurality of printers and a plurality of host computers connected to permit communication on a network and a method for presenting a required record time of the print system.

2. Related Background Art

In a prior art print system of this type such as a print system comprising host computers and printers connected thereto, it has been difficult to inform a time from the start to the end of printing to a user who executed the print operation or other user.

Thus, the user who executed the print operation is unaware of a time to acquire a printed output and other user who share the same printer is unaware of a waiting time to wait until the printer becomes available.

SUMMARY OF THE INVENTION

It is an object of the present invention to solve the above problem by recording data which is an index to the complexity of the print data in the print data when the host computer generates data to be printed, calculating a predicted print end time based on the data and informing it to the user of the print system.

It is other object of the present invention to solve the above problem and provide a print system and a method for presenting a required record time of the print system in which the print data to be outputted from the host computer to the printer is analyzed and quantified to an index representing the complexity, a required record time is calculated based on the equivalent value of the index for the printer, the required record time is presented to the host computer or the printer, a record end time is presented to a user of the host computer outputting the print data and a wait time to the start of record is presented to a user of the printer so that the use status of the printer is informed to the user of the print system.

In accordance with a first aspect of the present invention, there is provided a print system having a plurality of printers and a plurality of host computers connected to permit communication on a network, comprising quantifying means provided in each of the host computers for analyzing print data to be printed to quantify the print data to an index indicating complexity, transmission means provided in each of the host computers for adding the index quantified by the quantifying means to the print data and transmitting the print data to one of the printers through the network, operation means provided in each of the printers for converting the index added to the print data transmitted from the transmission means to a required record time based on a pre-registered conversion value, and presentation means provided in each of the printers for presenting the required record time converted by the operation means.

In accordance with a second aspect of the present invention, there is provided a print system having a plurality of printers and a plurality of host computers connected to permit communication on a network, comprising: quantifying means provided in each of the host computers for analyzing print data to be printed to quantify the print data to an index indicating complexity, transmission means provided in each of the host computers for adding the index quantified by the quantifying means to the print data and transmitting the print data to one of the printers through the network, operation means provided in each of the printers for converting the index added to the print data transmitted from the transmission means to a required record time based on a pre-registered conversion value, and presentation means provided in each of the printers for presenting the required record time converted by the operation means to the host computer which transmitted the print data through the network.

In accordance with a third aspect of the present invention, the quantifying means determines an attribute of a draw object of the print data to be printed and quantifies the print data to the index for each determined attribute of the draw object.

In accordance with a fourth aspect of the present invention, the quantifying means determines the presence or absence of access to an external storage when an attribute of the draw object of the print data to be printed is determined and quantifies the index for each determined attribute of the draw object.

In accordance with a fifth aspect of the present invention, the quantifying means determines an area process state to the print data when an attribute of the draw object of the print data to be printed is determined and quantifies the index for each determined attribute of the draw object.

In accordance with a sixth aspect of the present invention, the operation means includes evaluation means for comparing a required record time converted from the index added to the print data transmitted from the transmission means based on a pre-registered conversion value with an actually required print time to reevaluate the conversion value and memory means for storing the conversion value reevaluated by the evaluation means.

In accordance with a seventh aspect of the present invention, the memory means is a non-volatile memory.

In accordance with an eighth aspect of the present invention, the quantifying means determines the character, the bit map, the image of the graphic representation as the attribute of the draw object of the print data to be printed and quantifies the index representing the complexity for each attribute of the draw object.

In accordance with an ninth aspect of the present invention, the print data includes one of character, bit map image and graphic representation or a combination thereof as the draw object.

In accordance with a tenth aspect of the present invention, there is provided a print system having a plurality of printers and a plurality of host computers connected to permit communication on a network, comprising quantifying means provided in each of the host computers for analyzing print data to be printed, page by page to quantify the print data to an index indicating complexity page by page, transmission means provided in each of the host computers for adding the index quantified, page by page, by the quantifying means to the print data and transmitting the print data to one of the printers through the network, operation means provided in each of the printers for converting the index added to the print data, page by page, transmitted from the transmission means to a required record time, page by page, based on a pre-registered conversion value, and presentation means provided in each of the printers for presenting the required record time, page by page or in total, converted by the operation means.

In accordance with an eleventh aspect of the present invention, there is provided a print system having a plurality of printers and a plurality of host computers connected to permit communication on a network, comprising: quantifying means provided in each of the host computers for analyzing print data to be printed to quantify the print data to an index indicating complexity, and operation means provided in each of the host computers for receiving conversion values registered in the printers to calculate a required record time of the print data, the required record time calculated by the operation means being presented to presentation means provided in each of the host computers or being transmitted to the printer to be used for actual printing and presenting the required record time by presentation means provided in the printer.

In accordance with a twelfth aspect of the present invention, there is provided a print system further comprising evaluation means provided in each of the host computers for comparing the required record time calculated by the operation means provided in the host computer with the actually required print time to reevaluate the conversion value, and memory means provided in each of the host computers for storing the conversion value reevaluated by the evaluation means.

In accordance with a thirteenth aspect of the present invention, there is provided a print system having printers and host computers connected in 1-to-1 fashion or n-to-1 fashion, comprising quantifying means provided in each of the host computers for analyzing print data to be printed to quantify the print data to an index indicating complexity, output means provided in each of the host computers for adding the index quantified by the quantifying means to the print data and outputting the print data to the printers, operation means provided in each of the printers for converting the index added to the print data outputted from the output means to a required record time based on a pre-registered conversion value, and presentation means provided in each of the printers for presenting the required record time converted by the operation means.

In accordance with a fourteenth aspect of the present invention, there is provided a method for presenting a required record time of a print system having a plurality of printers and a plurality of host computers connected to permit communication on a network, comprising the steps of analyzing print data to be printed to quantify the print data to an index indicating complexity, adding the quantified index to the print data and transmitting the print data to one of the printers, converting the transmitted index added to the print data to a required record time based on a pre-registered conversion value, and presenting the converted required record time.

In the first aspect of the invention, when the print data to be printed is analyzed and quantified to the index representing the complexity by the quantifying means, the transmission means adds the quantified index to the print data and transmit it to one of the printers through the network, the operation means converts the index added to the transmitted print data to the required record time based on the pre-registered conversion value, and the presentation means presents the converted required record time to inform the required record time of each printer for the print data requested by the host computer to the user of the printer on the system.

In the second aspect of the invention, the index the print data to be printed is analyzed and quantified to the index representing the complexity by the quantifying means, the transmission means adds the index to the print data and transmits it to one of the networks, the operation means converts the index added to the transmitted print data to the required record time based on the pre-registered conversion value, and the presentation means presents the converted required record time through the network to the host computer which transmitted the print data to inform the required record time of each printer for the print data requested by the host computer to the user of the host computer on the system.

In the third aspect of the invention, the quantifying means determines the attribute of the draw object of the print data to be printed and quantifies the index for each determined attribute of the draw object to quantify the index representing the complexity for each attribute of the draw object.

In the fourth aspect of the invention, the quantifying means determines the presence or absence of the access to the external storage when the attribute of the draw object of the print data to be printed is determined and quantifies the index for each determined attribute of the draw object to quantify the index representing the complexity for each attribute of the draw object by taking the presence or absence of the access to the external storage into consideration.

In the fifth aspect of the invention, the quantifying means determines the area process status to the print data when the attribute of the draw object of the print data to be printed is determined and quantifies the index for each determined attribute of the draw object to quantify the index representing the complexity for each attribute of the draw object by taking the area process status to the print data into consideration.

In the sixth aspect of the invention, the operation means converts the index added to the print data transmitted form the transmission means to the required record time based on the pre-registered conversion value and the evaluation means compares the converted required record time with the actually required print time to reevaluate the conversion value and stores the evaluated conversion value in the memory means.

In the seventh aspect of the invention, the evaluated conversion value is updated and registered in the non-volatile memory to allow reference with high reproducibility.

In the eighth aspect of the invention, the quantifying means determines one of the character, the bit map, the image and the graphic representation as the attribute of the draw object of the print data to be printed to allow the quantization to the index representing the complexity for each determined attribute of the draw object.

In the ninth aspect of the invention, the quantifying means determines the attribute of the draw object of the print data including one of the character, the bit map, the image and the graphic representation or the combination thereof as the draw object to be printed and quantifies to the index representing the complexity for each determined attribute of the draw object.

In the tenth aspect of the invention, the quantifying means analyzes, page by page, the print data to be printed and quantifies it to the index representing the complexity, page by page, the transmission means adds the index quantified page by page to the print data and transmits it to one of the printers through the network, the operation means converts the page by page index added to the transmitted print data to the page by page required record time based on the pre-registered conversion value, and the presentation means presents the converted page by page required record time or total required record time to inform the required record time of each printer for the page by page print data requested by the host computer to the user of the printer on the system.

In the eleventh aspect of the invention, the quantifying means analyzes the print data to be printed and quantifying it to the index representing the complexity, the host computers receive the conversion value registered in the printers, the operation means on the host computer converts the required record time of the print data and presents the converted required record time to the presentation means provided in the host computer or the printer to inform the time to wait until the printer becomes available to the user of the print system. The host computer calculates the required record time of the printer to allow the selection of the optimum printer.

In the twelfth aspect of the invention, the conversion value of the printer is read from the memory means provided on the host computer, the operation means provided in the host computer compares the converted required record time with the actually required print time, the evaluation means on the host computer reevaluates the conversion value and stores the reevaluated conversion value in the memory means on the host computer to allow the utilization of the printer without the time function or the memory means as the printer of the print system of the present invention.

In the thirteenth aspect of the invention, the quantifying means on the host computer analyzes the print data to be printed and quantifies it to the index representing the complexity, the output means adds the quantified index to the print data and outputs it to the printer, the operation means on the printer converts the index added to the print data outputted from the output means to the required record time based on the preregistered conversion value, the presentation means presents the converted required record time. Thus, in the print system having the printers and the host computers in the 1-to-1 or 1-to-n fashion, the required record time of the connected printer is calculated and informed to the user.

In the fourteenth aspect of the invention, in the method for presenting the required record time of the print system having the printers and the host computers connected to permit the communication on the network, the print data to be printed is analyzed to quantify the print data to an index indicating complexity, the quantified index is added to the print data and transmitting the print data to one of the printers, the transmitted index added to the print data is converted to the required record time based on the preregistered conversion value, and the converted required record time is presented to inform the required record time of each printer for the print data requested by the host computer to the user of the printer on the system.

BRIEF DESCRIPTION OF THE DRAWINGS

FIG. 4 shows a flow chart of an embodiment of the quantifying process of a bit map as the print object in accordance with the present invention, FIG. 5 shows a flow chart of an embodiment of the quantifying process of an image as the print object in accordance with the present invention.

DETAILED DESCRIPTION OF THE PREFERRED EMBODIMENTS

As an embodiment of the print system according to the first aspect of the present invention, a configuration comprising a plurality of host computers and a plurality of printers is explained.

Figure 1:
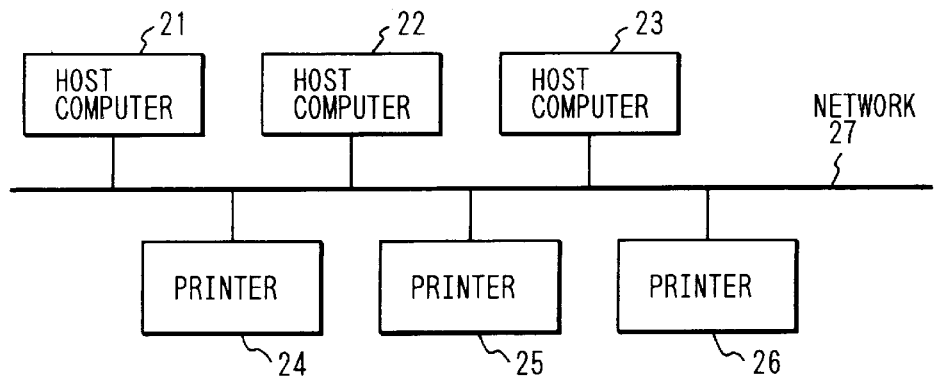
FIG. 1 shows a block diagram of a configuration of a print system of a first embodiment of the present invention.

FIG. 1 shows a block diagram of a configuration of the print system in accordance with a first embodiment of the present invention.

In FIG. 1, numerals 21, 22 and 23 denotes host computers each having a CPU, a RAM and a ROM and each including a keyboard, a pointing device, a hard disk (HD) drive and a floppy disk (FD) drive, not shown. Each of the host computers 21, 22 and 23 is configured to execute a communication program stored in the ROM or the hard disk (HD) to communicate with printers 24 to 26 connected to a network 27.

Numerals 24, 25 and 26 denotes printers. They are connected to each other through the network 27 and are assigned with network addresses (for example, IP addresses) for unique identification on the network 27. Printer engines of the printers 24, 25 and 26 may be ink jet printer engines or laser printer engines. Throughput of the printers 24, 25 and 26 may be different from each other and the different throughput do not prevent the application of the present invention. The printers 24, 25 and 26 have printer controllers (each having a CPU, a RAM and a ROM) and control the communication with the host computers 21 to 23 and the storing of the printer engines. The printers 24 to 26 have console panels, not shown, having liquid crystal displays for displaying various states.

A method for quantifying the complexity of data to be printed to the host computer in the present embodiment is now explained. The complexity of the print data is first discussed.

In the printer, as a draw object to be printed, characters, a bit map, an image, a graphic representation and a combination thereof are to be considered.

Factors to increase the complexity are discussed for each draw object.

[Characters]

In general, when characters are to be printed, the host computer registers only coded information such as JIS code or ASCII code (hereinafter referred to as character codes) as the print data and character shape data in a bit map form (bit map font or simply font) corresponding to the character codes is read from the read-only memory (ROM) in the printer and it is printed out. Thus, the complexity is low and short time printing is attained. This print method is referred to as a first print method by the character codes.

On the other hand, when characters of shapes for which the printer has no font are to be printed, the character shape data (bit map data) generated by the host computer is registered as it is as the print data and the read bit map data is printed as it is in the printer. Thus, the complexity is higher than that of the first print method and the processing time is longer. This print method is referred to as a second print method by the bit map.

When the size of the character or graphics representation to be printed by the bit map is large, certain data compression process may be effected in order to reduce the data quantity between the host computer and the printer. In this case, since the decompression process is effected in the printer, the complexity is further increased and the processing time is longer. This print method is referred to as a third print method by the compressed bit map.

When the characters are to be printed by using outline font, an operation process to determined Bezier curves and B-spline curves from control point information to determine outline information and a process for line drawing the outlines or painting them are required in the printer. Thus, the complexity is higher than that of usual character print process and the processing time is longer. This print method is referred to as a fourth method by the outline font.

The larger the size of the character is, the larger is the memory size required and the longer is the processing time. This may be adjusted by multiplying a factor.

[Bit Map]

When a simple graphic representation or mark is to be printed, that portion is registered in the print data as bit map data and the bit map data is printed as it is in the printer. This is the same process as that of the print method by the bit map described above. When a process such as rotation or decompression is added, the complexity of the process is higher than that of the simple bit map process, the required memory size increases and the process time is longer.

The larger the size is, the longer is the process time. In the present embodiment, a modification process such as rotation or decompression is included for the bit map but no modification process is included in the print method of characters by the bit map.

[Image]

For the image, image data is registered as the print data as it is for the bit map and the image data is printed as it is in the printer. This is the same process as that of the print method by the bit map described above but the complexity is high because the image is generally of larger size than the bit map, the print data is of larger quantity and larger memory size is required.

The larger the image size is, the longer is the process time. When the process of modification or rotation or the compression/decompression process to reduce the data quantity is added, the complexity is higher than that of the simple image processing, the required memory size is larger and the process time is longer. When a color image is to be printed, the complexity is significantly higher and the process time is longer.

[Graphic Representation]

When a graphic representation is printed in the present embodiment, a draw process is effected in which only geometrical information (outline vector) is registered as the print data in the host computer and the graphic information is composed in the printer. In this case, the larger the number of apexes is, the higher is the complexity and the longer is the process time.

When the outline of the graphics consists of a curved line, an operation process to determine Bezier curves and B-spline curves are required in the printer and the complexity is higher and the process time is longer.

Factors of complexity other than the draw object are explained below.

[Clipping]

The printer usually has a function to designate an outline of a rectangle or a graphic representation and draw only within the outline. This is called a clipping function. An area drawn by the clipping is called a clipping area. When the clipping function is used, the overlap of the draw object and the clipping area is checked and if it is a first case, the draw object included in the clipping area is drawn as it is. If it is a second case, the draw object not included in the clipping area is not drawn. If it is a third case, the draw object partly included in the clipping area is extracted only for the included area to generate a new draw object. Thus, as the clipping function is executed, the first to third processes must be executed and the complexity increases and the process time increases.

Factors of the increase of the process time not directly related to the draw process are now explained.

[External Storage]

Since a character which has modified in a complex manner needs a large area to store the shape thereof, it may be stored in an external storage (such as a hard disk). In this case, a longer time than a time to read font data from a ROM is required and the process time is longer.

A method for quantifying the complexity of the data to be recorded is now explained.

In the method of the present embodiment, a process for each character by a character code printing method which is a shortest time process is defined as a unit process, and a number indicating multiple of the unit process is used as an index of the complexity of the process. The number of characters for the unit process need not be limited to one character.

When an additional process such as rotation, enlargement or reduction is to be applied to an object to be printed, the process becomes complex accordingly and a constant is multiplied. Further, since the complexity of process increases by the size of the print object, a constant is multiplied. When font data is to be read externally, an additional process time is required and a constant is multiplied.

Referring to a flow chart of FIG. 2, a process for quantifying the complexity for each object when the object to be printed is registered as print data is explained below.

In the present embodiment, the quantization of the clipping which is a complexity factor other than the draw object is conducted in the process of each graphic object.

In the present embodiment, the clipping is set for a page and a constant is multiplied to all graphics objects drawn in the page set by the clipping to produce the index of complexity. Referring to FIG. 1, relations between the present embodiment and the means of the first to ninth aspects of the invention and the operations thereof are explained.

In the first aspect of the invention, in the print system having a plurality of printers 24 to 26 and a plurality of host computers 21 to 23 connected to permit communication on the network 27, the quantifying means (the CPU of each host computer) is provided in each of the host computers for analyzing print data to be printed to quantify the print data to an index indicating complexity, the transmission means (constructed as the means for executing the communication program by the CPU of each host computer) is provided in each of the host computers for adding the index quantified by the quantifying means to the print data and transmitting the print data to one of the printers through the network, the operation means (by the CPU's of the printers 24 to 26) is provided in each of the printers for converting the index added to the print data transmitted from the transmission means to a required record time based on a pre-registered conversion value, and the presentation means (constructed as the means for executing the presentation processing program by the CPU's of the printers 24 to 26) is provided in each of the printers for presenting the required record time converted by the operation means. When the print data to be printed is analyzed and quantified to the index representing the complexity by the quantifying means, the transmission means adds the quantified index to the print data and transmit it to one of the printers through the network, the operation means converts the index added to the transmitted print data to the required record time based on the pre-registered conversion value, and the presentation means presents the converted required record time to inform the required record time of each printer for the print data requested by the host computer to the user of the printer on the system.

In the second aspect of the invention, the index the print data to be printed is analyzed and quantified to the index representing the complexity by the quantifying means on the host computer, the transmission means adds the index to the print data and transmits it to one of the networks, the operation means converts the index added to the transmitted print data to the required record time based on the pre-registered conversion value, and the presentation means presents the converted required record time through the network 27 to the host computer which transmitted the print data to inform the required record time of each printer for the print data requested by the host computer to the user of the host computer on the system.

In the third aspect of the invention, the quantifying means on the host computer determines the attribute of the draw object of the print data to be printed and quantifies the index for each determined attribute of the draw object to quantify the index representing the complexity for each attribute of the draw object.

In the fourth aspect of the invention, the quantifying means on the host computer determines the presence or absence of the access to the external storage (eg the hard disk (HD)) when the attribute of the draw object of the print data to be printed is determined and quantifies the index for each determined attribute of the draw object to quantify the index representing the complexity for each attribute of the draw object by taking the presence or absence of the access to the external storage into consideration.

In the fifth aspect of the invention, the quantifying means determines the area process status (clipping to be described later) to the print data when the attribute of the draw object of the print data to be printed is determined and quantifies the index for each determined attribute of the draw object to quantify the index representing the complexity for each attribute of the draw object by taking the area process status of the print data into consideration.

In the sixth aspect of the invention, the operation means converts the index added to the print data transmitted from the transmission means to the required record time based on the pre-registered conversion value and the evaluation means compares the converted required record time with the actually required print time to reevaluate the conversion value and stores the evaluated conversion value in the memory means.

In the seventh aspect of the invention, the evaluated conversion value is updated and registered in the non-volatile memory (eg NVRAM not shown) to allow reference with high reproducibility.

In the eights aspect of the invention, the quantifying means determines one of the character, the bit map, the image and the graphic representation as the attribute of the draw object of the print data to be printed to allow the quantization to the index representing the complexity for each determined attribute of the draw object.

In the ninth aspect of the invention, the quantifying means determines the attribute of the draw object of the print data including one of the character, the bit map, the image and the graphic representation or the combination thereof as the draw object to be printed and quantifies to the index representing the complexity for each determined attribute of the draw object.

Figure 2:
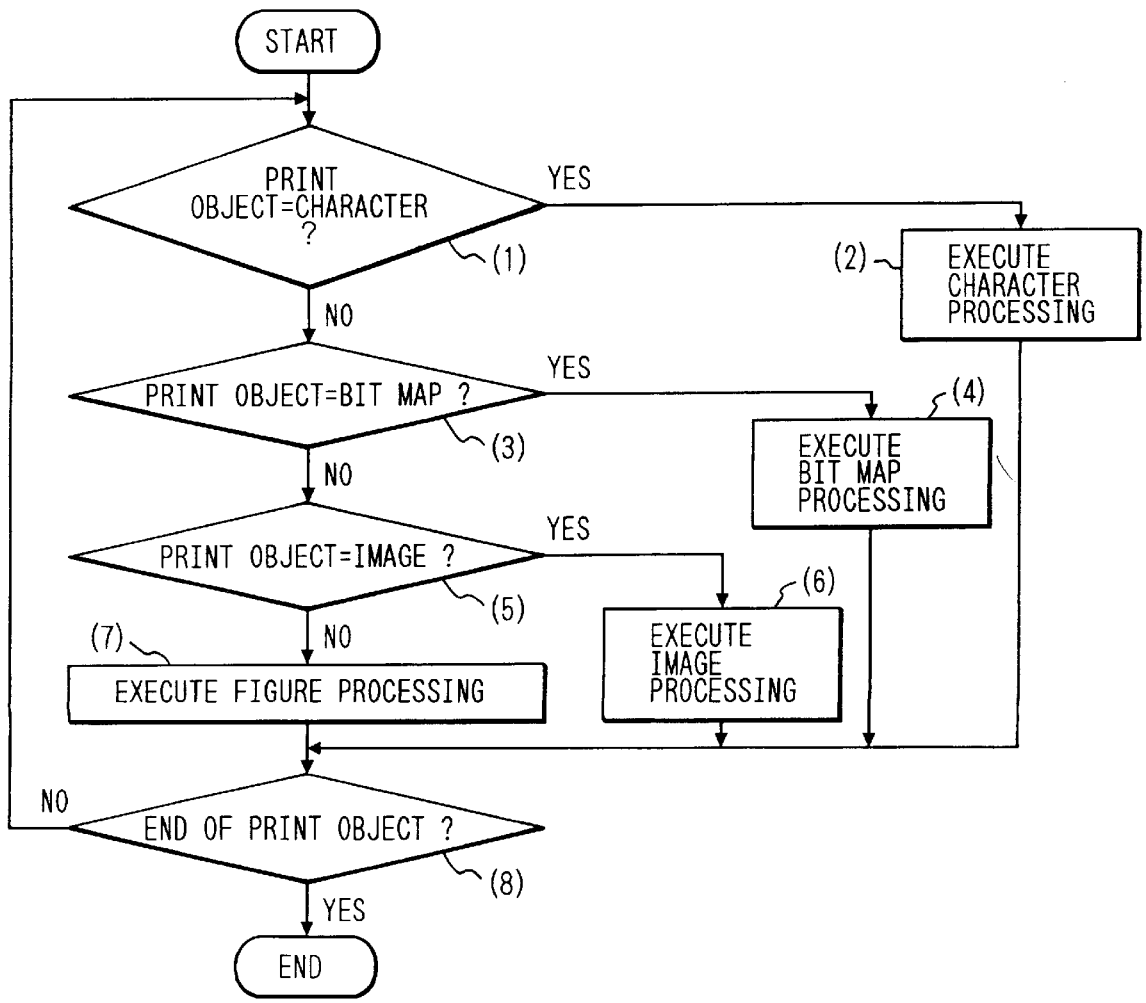
FIG. 2 shows a flow chart of an embodiment of a main process in a quantifying process of a print object in accordance with the present invention.

FIG. 2 shows a flow chart of an embodiment of a main process in the quantifying process of the print object in the present invention, in which (1) to (8) represent the respective steps.

When an object is inputted, the type of the print object is examined, and if the object type is character (1), the character process is conducted (2). If the object type is not the character but the bit map (3), the bit map process is conducted (4). If the object type is not the character or the bit map but the image (5), the image process is conducted (6). If the object type is not the character, the bit map or the image, the graphic process is conducted (7). The above steps are repeated and when the input of the object to be printed is completed (8), the process is terminated.

[Character]

The quantization of complexity of character is conducted in the following manner. The number of characters to be printed by the character code printing method is counted and the total count is used as the index of the complexity.

When the character shape data is to be read from the external storage, a unit a (1<a) is added for each character to determine the index of complexity.

A unit b per character is assigned to the bit map printing method and b is accumulated by the number of characters to be printed by that method to determine the index of complexity. When the character shape data is to be read from the external storage, a unit c per character (b<c) is assigned to determine the index of complexity.

A unit d per character is assigned to the compressed bit map printing method and d is accumulated by the number of characters to be printed by that method to determine the index of complexity. When the character shape data is to be read from the external storage, a unit e per character (d<e) is assigned to determine the index of complexity.

A unit f per character is assigned to the outline font print method and f is accumulated by the number of characters to be printed by that method to determine the index of complexity. When the character shape data is to be read from the external storage, a unit g per character (f<g) is assigned to determine the index of complexity.

The respective quantifying processes for the above are now explained in conjunction with flow charts.

Figure 3B:
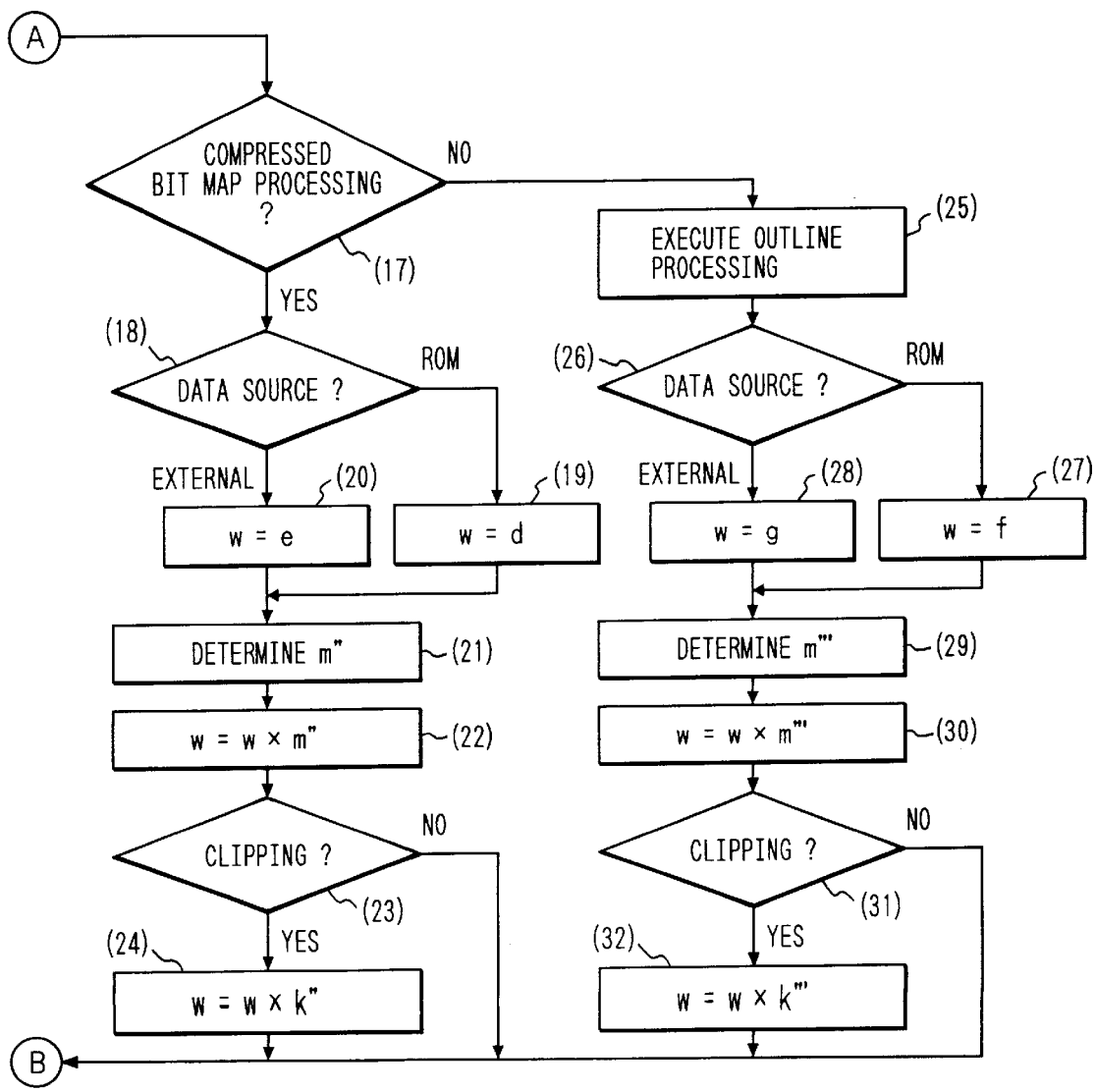
FIG. 3 is comprised of FIG. 3A and FIG. 3B showing flow charts of an embodiment of the quantifying process of characters as the print object in accordance with the present invention.

FIGS. 3A and 3B show flow charts of one embodiment of the character quantifying process for the print object in the present invention.

In the input character is to be printed by the character code (1), whether the character shape data is to be read from the ROM or the external storage is determined (2), and the work variable w is set to 1 or a depending on the determination (3), (4). Then, a constant m representing the size of the character is determined (5) by looking up the table memory, for example. Then, the work variable w is multiplied by the constant m (6). Then, if the clipping is set for the page (7), the work variable is multiplied by a constant k determined by the clipping (8). Then, the product is added to the index of complexity X for the entire data to be printed.

On the other hand, in the step (1), if the bit map process is required instead of the character code process (9), whether the character shape data is to be read from the ROM or the external storage is determined (10), and the work variable w is set to b or c depending on the determination (11), (12). Then, a constant m' is determined by the size of the character (13). Then, the work variable w is multiplied by the constant w' (14). Then, if the clipping is set for the page (15), the work variable w is multiplied by a constant k' determined by the clipping (16). Then, the product is added to the index of complexity X of the entire data to be printed (33). Then, the character data is stored as the print data (34).

On the other hand, in the step (9), if the compressed bit map process is required instead of the bit map process (17), whether the character shape data is to be read from the ROM or the external storage is determined (18), and the work variable is set to d or e depending on the determination (19), (20). Then, a constant m" is determined by the size of the character (21). Then, the work variable w is multiplied by the constant m" (22). Then, if the clipping is set for the page (23), the work variable w is multiplied by a constant k" determined by the clipping (24). Then, the product is multiplied to the index of complexity X of the entire data to be printed (33). Then, the character data is stored as the print data (34).

On the other hand, in the step (17), if the compressed bit map process is not required, the outline process is selected (25). Whether the character shape data is to be read from the ROM or the external storage is determined (26), and the work variable w is set to f or g depending on the determination (27), (28). Then, a constant m'" is determined by the size of the character (29). Then, the work variable w is multiplied by the constant m'" (30). Then, if the clipping is set for the page (31), the work variable w is multiplied by a constant k'" determined by the clipping (32). Then, the product is added to the index of complexity X of the entire data to be printed (33). Then, the character data is stored as the print data (34).

[Bit Map]

Referring to a flow chart of FIG. 4, the quantifying process of the complexity of the bit map is explained.

FIG. 4 shows a flow chart of an embodiment of the bit map quantifying process as the point object in the present invention, in which (1) to (13) represent the respective steps.

A process unit for the bit map is set to b (1) as it is in the bit map print method for the character. Then, a constant n is determined by the size of the bit map (2) by looking up the table memory as it is for the character. Then, if the magnification is to be changed (3), the constant n is changed to n' in accordance with the magnified size (4). Then, if a modification is to be conducted (5), a constant p determined by the modification process is determined (6). In no modification process is to be conducted, p is set to '1'. Then, if a rotation process is to be conducted (7), a constant q is determined by the rotation process (8). If no rotation process is to be conducted, q is set to '1'.

Then, if the clipping is set for the page (9), a constant r is determined by the clipping (10). Then, the work variable w is multiplied by the constants n, p, q and r (11). Then, the product is added to the index of complexity X of the entire data to be printed (12). Then, the bit map data is stored as the print data (13).

[Image]

Referring to a flow chart of FIG. 5, the quantifying process for the complexity of the image is explained. The process is based on a monochromatic image.

FIG. 5 shows a flow chart of one embodiment of the image quantifying process as the print object in the present invention.

The image process unit is set to b (1) as it is in the character bit map printing method. Then, a constant s is determined by the size of the image (2) by looking up the table memory as it is for the character. Then, if the magnification is to be changed, the constant s is changed to s' in accordance with the magnified size (4). Then, if a modification process is to be conducted (5), a constant is determined by the modification process (6). If no modification process is to be conducted, the constant t is set to '1'. Then, if a rotation process is to be conducted (7), a constant u is determined by the rotation process (8). If no rotation process is to be conducted, the constant u is set to '1'.

Then, if the image to be processed is a color image (9), a constant v is determined by the color image (10). If it is a monochromatic image, the constant v is set to '1'. Then, if the clipping is set for the page (11), a constant y is determined by the clipping (12). Then, the work variable w is multiplied by the constants s, t, u, v and w (13). Then, the product is added to the index of complexity X of the entire data to be printed (14). Then, the bit map data is stored as the print data (15).

[Graphic Representation]

The complexity of the graphic representation is quantified in the following manner. For a polygon, the process unit is determined by the number of vectors of the outline and it is multiplied by a constant for the size of a bounding box of the polygon (a rectangle defined by minimum x and y coordinates of the vectors of all outlines) to determine the index of complexity.

For a graphics representation which uses the Bezier curves or the B-spline curves, a process unit determined for the Bezier curves or the B-spline curves multiplied by the number of curves is added to the index of complexity determined by the number of vectors of the outlines to determine the index of complexity. In the present embodiment, it is assumed that only the Bezier curves are used.

Figure 6:
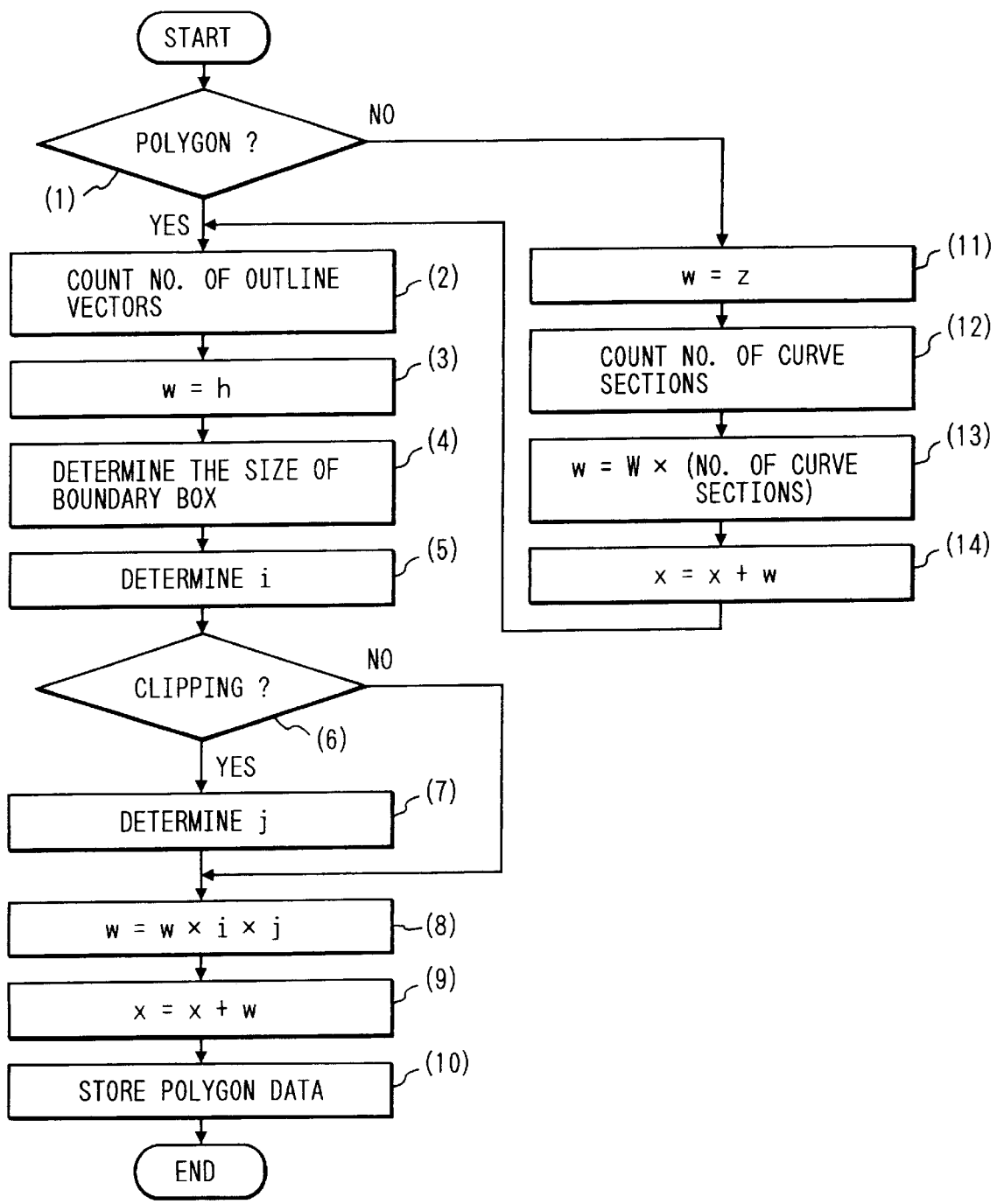
FIG. 6 shows a flow chart of an embodiment of the quantifying process of a graphic representation as the print object in accordance with the present invention.

Referring to a flow chart of FIG. 6, the quantifying process of the complexity of the graphic representation is explained.

FIG. 6 shows a flow chart of an embodiment of the quantifying process of the graphic representation as the print object in the present invention.

If an input graphic representation is a polygon (1), the number of vectors of the outlines is counted (2). Then, a constant h is determined by the number of vectors and it is set to the work variable w (3) by looking up the table memory. Then, a size of the polygon bounding box is determined (4).

Then, a constant i is determined by the size of the bounding box (5) by looking up the table memory. Then, if the clipping is set for the page (6), a constant i is determined by the clipping (7). Then, the work variable w is multiplied by the constant i and j (8). Then, the product is added to the index of complexity X of the entire data to be printed (9). Then, the polygon data is stored as the print data (10).

On the other hand, in the step (1), if the input graphic representation includes a curved portion, an index unit z for the complexity of the processing of the curved portion is set to the work variable w (11). Then, the number of curved portions is counted (12) and the work variable w is multiplied by the number of curved portions (13). Then, the product is added to the index of complexity X of the entire data to be printed (14). Then, the process proceeds to the step (2) to process the portion defined by the outline vectors.

In the print system shown in FIG. 1, a process to present the time relating to the print process to the user of the print system is now explained.

Figure 7:
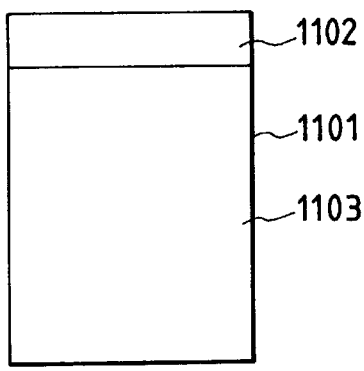
FIG. 7 shows an example of logical structure for storing the print data of a printer in the print system shown in FIG. 1, FIG. 8 show a flow chart of an example of process for presenting a time required for the processing of the entire print data in executing the print operation in the print shown in FIG. 1 to a user of the print system.

FIG. 7 shows an example of logical structure when the print data of the printer in the print system shown in FIG. 1 is stored.

In FIG. 7, numeral 1101 denotes the entire print data which is a unit called a file in a general computer system. This is referred to as a print data file. The width of the rectangle 1101 represents one byte size. It is assumed that the a leading edge (smaller address) of the printer data file is upward. Numeral 1102 denotes an area in which the index of complexity of the entire print data is set. Numeral 1103 denotes an area in which the data of the object to be printed, that is, the print data is stored.

In the logical structure of the present embodiment, the index of complexity of the entire data is set at the top of the logical structure although the area is not restrictive.

In accordance with the illustrated logical structure, the time required for the process of the entire print data at the execution of the printing by the printer may be readily presented to the user of the print system.

Figure 8:
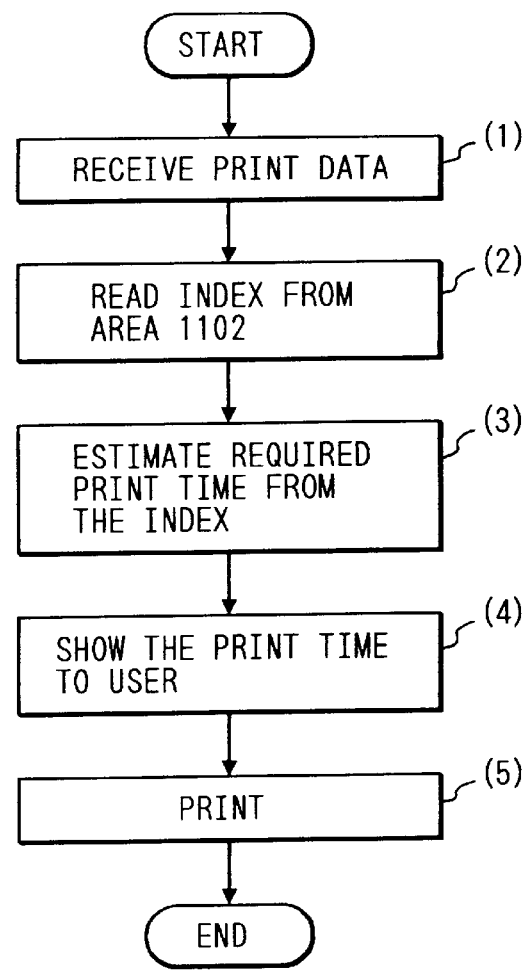

Referring to a flow chart of FIG. 8, the process to present the time required to process the entire print data at the execution of printing by the printer to the user of the print system is explained.

FIG. 8 shows a flow chart of an example of the process for presenting to the user of the print system the time required for the process of the entire print data at the execution of printing by the printer shown in FIG. 1. Numerals (1) to (5) represent the respective steps.

When one printer 21 connected to the network 27 receives a print data file 1101 from one computer 24 connected to the same network 27 (1), the printer 24 reads the index of complexity of the print data from the area 1102 in which the index of complexity of the entire print data is stored, by the logical structure of FIG. 7 (2). Then, the printer 24 calculates the time required for the printing based on the index (3) and presents it to the user (4). Then, the printer 24 reads the print data from the area 1103 in which the print data is stored, of the print data file 1101 to conduct the printing (5).

The presentation step (4) may be conducted by a display device such as a liquid crystal display provided on the printer, by an LED provided on the printer, by returning the numeric data to the host computer 21 which conducted the printing through the network 27 to display it on a display device on the host computer, by returning the numeric data to a particular host computer through the network 27 to inform it from the host computer to any device through the network 27, or by sending the numeric data from the printer 24 to any device connected to the network 27. The presentation is identical in the present embodiment and the second embodiment.

Referring to FIGS. 1, 2 and 8, the relation between the present embodiment and the means of the fourteenth aspect of the invention and the operations thereof are explained.

In the fourteenth aspect of the present invention, as shown in FIG. 1, there is provided a method for presenting a required record time of a print system having a plurality of printers 24 to 26 and a plurality of host computers 21 to 23 connected to permit communication on the network 27, comprising the quantifying step (steps (1) to (8) of FIG. 2) of analyzing print data to be printed to quantify the print data to an index indicating complexity, the transmission step (post steps after the steps (1) to (8) of FIG. 2, detail of which is not shown) for adding the quantified index to the print data and transmitting the print data to one of the printers, the operation step (steps (1) to (3) of FIG. 8) for converting the transmitted index added to the print data to a required record time based on a pre-registered conversion value, and the presentation step (step (4) of FIG. 8) for presenting the converted required record time.

Figure 9:
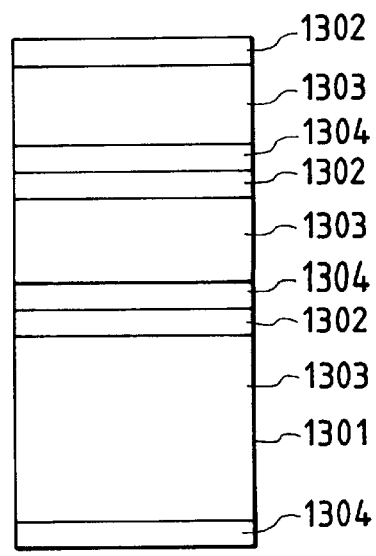
FIG. 9 shows another example of logical structure for storing the print data of the printer in the print system shown in FIG. 1.

FIG. 9 shows another example of the logical structure used to store the print data of the printer in the print system shown in FIG. 1.

In FIG. 1, numeral 1301 represents the entire print data which is a unit called as a file in a general computer system. This is referred to as a print data file. A width of the rectangle 1301 represents one byte size. A leading edge (smaller address) of the print data file is upward. Numeral 1302 denotes an area in which the index of complexity for each page of the print data is stored. Numeral 1303 denotes an area in which the data of object to be printed in a page, that is, the print data to be printed in the page is stored. Numeral 1304 denotes a code indicating the end of the page data which is set following the data of the object to be printed in the page. This is referred to as a page end code.

In the logical structure shown in the present embodiment, the index of complexity for each page is set immediately before the print data of each page although the area is not restrictive.

In accordance with the logical structure shown in FIG. 9, the time required for processing the print data for the page at the execution of printing by the printer is readily presented to the user of the printer system. This is explained in conjunction with a flow chart shown in FIG. 10.

Figure 10:
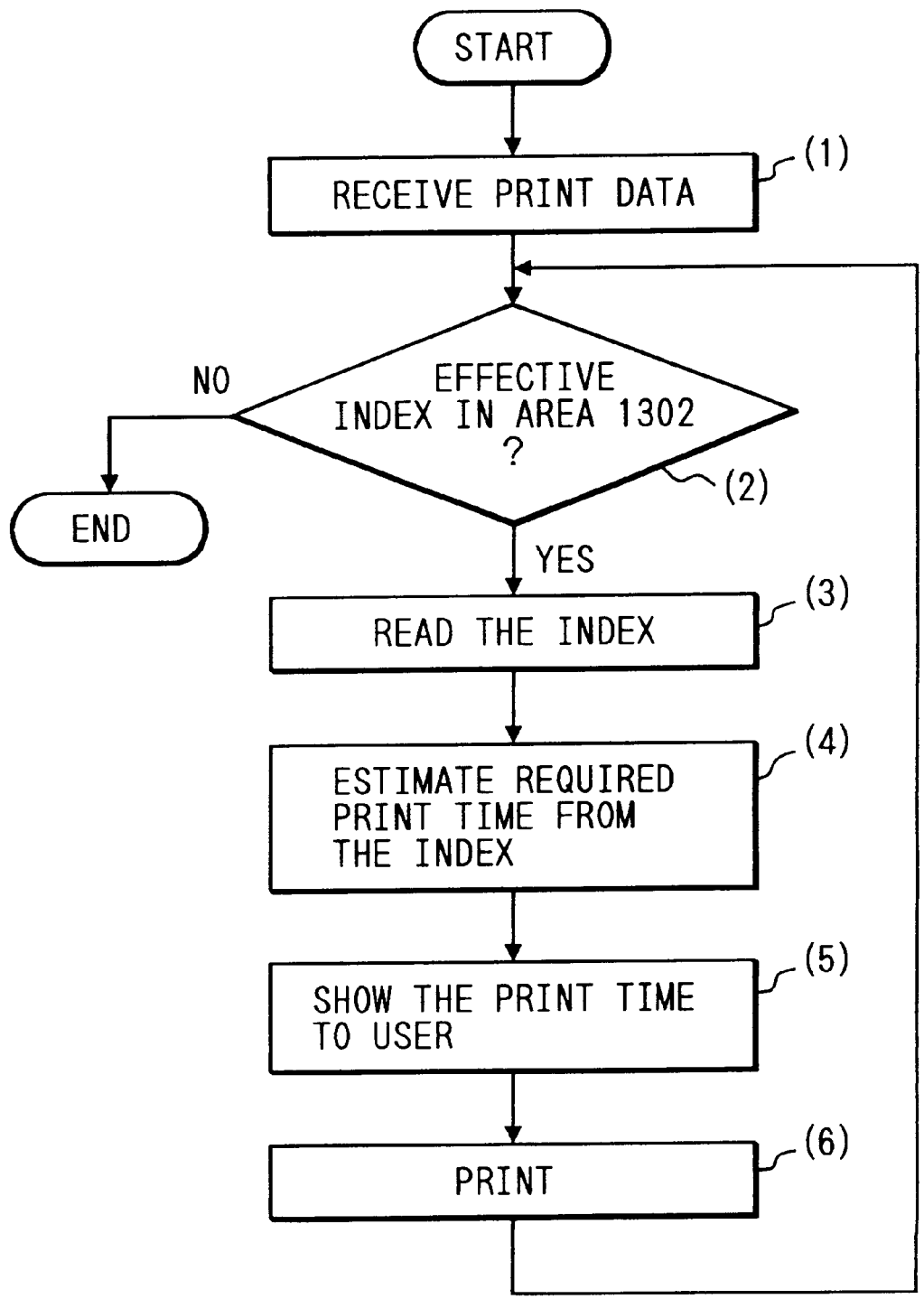
FIG. 10 shows a flow chart of other example of process for presenting the time required for the processing of the entire print data in executing the print operation in the printer shown in FIG. 1 to a user of the print system.

FIG. 10 shows a flow chart of another example of the process for presenting to the user of the print system the time required for processing the entire print data at the execution of printing by the printer shown in FIG. 1. Numerals (1) to (6) denote the respective steps.

When one printer 21 connected to the network 27 receives the print data file 1301 from one host computer 24 connected to the same network 27 (1), the printer 24 determines by the logical structure of FIG. 9 whether a valid index is present in the area 1302 in which the index of complexity of the print data to be printed on the first page is stored is determined (2), and if there is a valid index, it reads the index of complexity of the print data of that page from the area 1302 (3). Then, the printer 24 calculates the time required for printing based on the index (4) and presents it to the user (5).

Then, the printer 24 reads the print data from the area 1303 in which the print data of that page is stored, of the print data file 1301 and conducts the printing until the page end code 1304 appears (6). When the page end code 1304 appears (2), whether a valid index is present in the area 1302 in which the index of complexity of the print data to be printed on the page following to the page end code 1304 is stored is determined (2), and if it is present, the process is continued, and if it is not present, the process is terminated.

The process by the logical structure shown in FIG. 7 and the processes by the logical structures shown in FIGS. 9 and 8 are not exclusive but both may be executed in combination so that more information on the time to complete the printing may be presented to the user of the print system.

[Second Embodiment]

As a second embodiment of the present invention, a construction of a print system comprising a plurality of host computers and a plurality of printers is explained. The second embodiment to be explained hereinlater may be implemented by a block diagram configuration which is identical to that shown in FIG. 2. A relation between the present embodiment and the means of the tenth and eleventh aspects of the invention and the operations thereof are explained in conjunction with FIG. 1.

In accordance with a tenth aspect of the present invention, there is provided a print system having a plurality of printers 24 to 26 and a plurality of host computers 21 to 23 connected to permit communication on the network 27, comprising quantifying means (CPU of each host computer) provided in each of the host computers for analyzing print data to be printed, page by page to quantify the print data to an index indicating complexity page by page, transmission means (constructed as the means for executing the communication program by the CPU of each host computer) provided in each of the host computers for adding the index quantified, page by page, by the quantifying means to the print data and transmitting the print data to one of the printers through the network, operation means (CPU's of the printers 24 to 26) provided in each of the printers for converting the index added to the print data, page by page, transmitted from the transmission means to a required record time, page by page, based on a pre-registered conversion value, and presentation means (constructed as the means for executing the presentation program by the CPU's of the printers 24 to 26) provided in each of the printers for presenting the required record time, page by page or in total, converted by the operation means. The CPU on the host computer analyzes, page by page, the print data to be printed and quantifies it to the index representing the complexity, page by page, the CPU of each host computer executes the communication program to add the index quantified page by page to the print data and transmits it to one of the printers through the network, the CPU of the printer converts the page by page index added to the transmitted print data to the page by page required record time based on the pre-registered conversion value, and the presentation means presents the converted page by page required record time or total required record time to inform the required record time of each printer for the page by page print data requested by the host computer to the user of the printer on the system.

In the eleventh aspect of the invention, the quantization means and the operation means are provided on the host computer and the presentation means are provided on the host computer or the printer. The quantifying means on the host computer analyzes the print data to be printed and quantifying it to the index representing the complexity, the host computers receive the conversion value registered in the printers, the CPU on each host computer converts the required record time of the print data and the CPU of each host computer presents the converted required record time to the presentation means provided in the host computer or transfers it to each of the printers 24 to 26 to present on the liquid crystal display of the print system to inform the time to wait until the printer becomes available to the user of the print system. The host computer calculates the required record time of the printer to allow the selection of the optimum printer.

A method for quantifying the complexity of the data to be printed in the print system shown in the second embodiment of the present invention is now explained. The quantization is executed by the same method as that of the print system of the first embodiment of the present invention.

The process for presenting the time relating to the print process to the user of the print system by the print system shown in the second embodiment of the present invention is now explained. The data of the same logical structure as those shown in FIGS. 7 and 9 is used.

Figure 11:
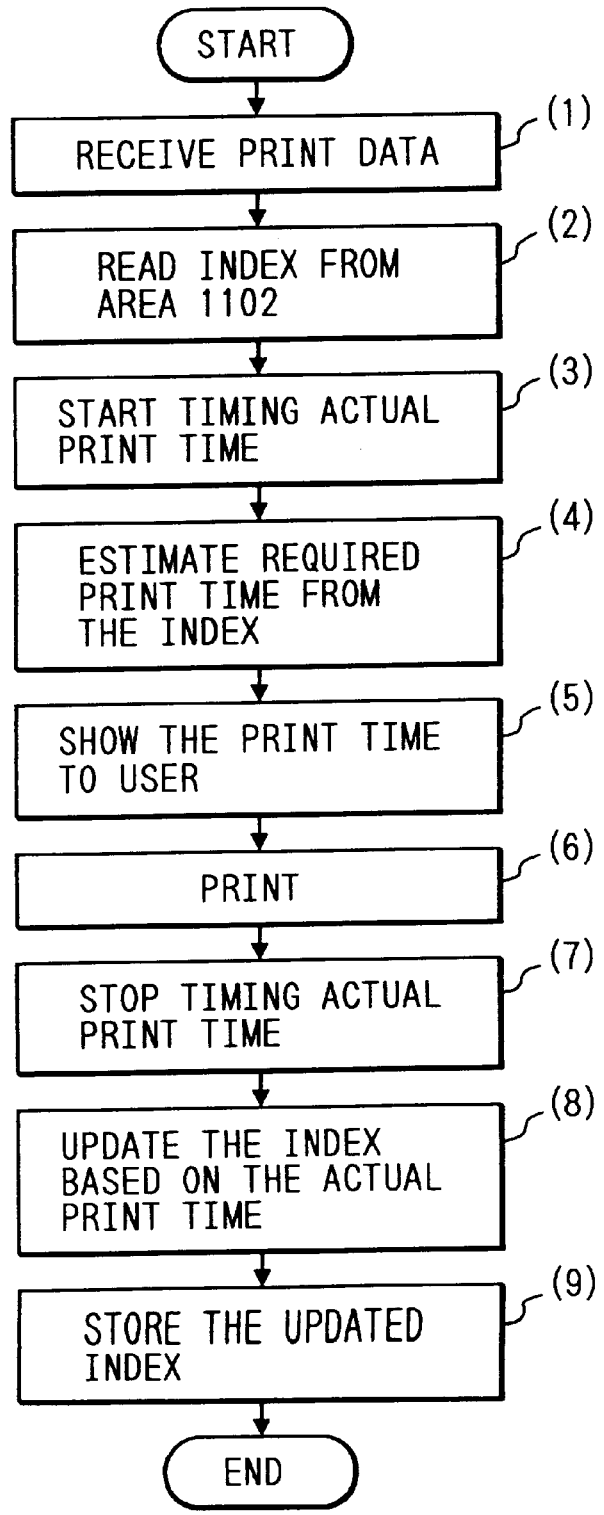
FIG. 11 shows a flow chart of an example of process for presenting a time relating to the print operation to a user by a print system in accordance with a second embodiment of the present invention.

FIG. 11 shows a flow chart of an example of the process for presenting the time relating to the print process to the user of the print system in the second embodiment of the present invention. Numerals (1) to (9) denote the respective steps and the print data structure corresponding to the data logical structure shown in FIG. 7.

When one printer 21 connected to the network 27 receives the print data file 1101 from one host computer 24 connected to the same network 24 (1), the printer 24 reads the index of complexity of the print data from the area 1102 in which the index of complexity of the entire print data is stored by the logical structure of FIG. 7 (2). Then, the printer 24 starts to count the time required for printing (3). Then, the printer 24 calculates the time required for the printing base on the index (4) and presents it to the user (5). Then, the printer 24 reads the print data of print data file 1101 to print it (6). When the printing is completed, the printer stops the counting (7) and updates the index of complexity based on the actual print time (8) and stores it (9). In the next print process, the updated and stored index of complexity is used.

On the other hand, the index of complexity used in calculation step (4) is preset based on the performance of the printer and it is updated at each print process. This value is multiplied by the index read from the print data to determine the time required for the processing. The process time may be presented by this process and the current time as well as the completion time may also be presented. In the present embodiment, the calculation is conducted by the printer 24. Alternatively, the index of complexity read in the step (2) and the latest updated index of complexity may be transmitted to the host computer 21 which conducted the print process through the network 27 and the calculation may be conducted on the host computer 21, or it may be transmitted to any device connected to the network 27 and the calculation may be conducted on that device.

Figure 12:
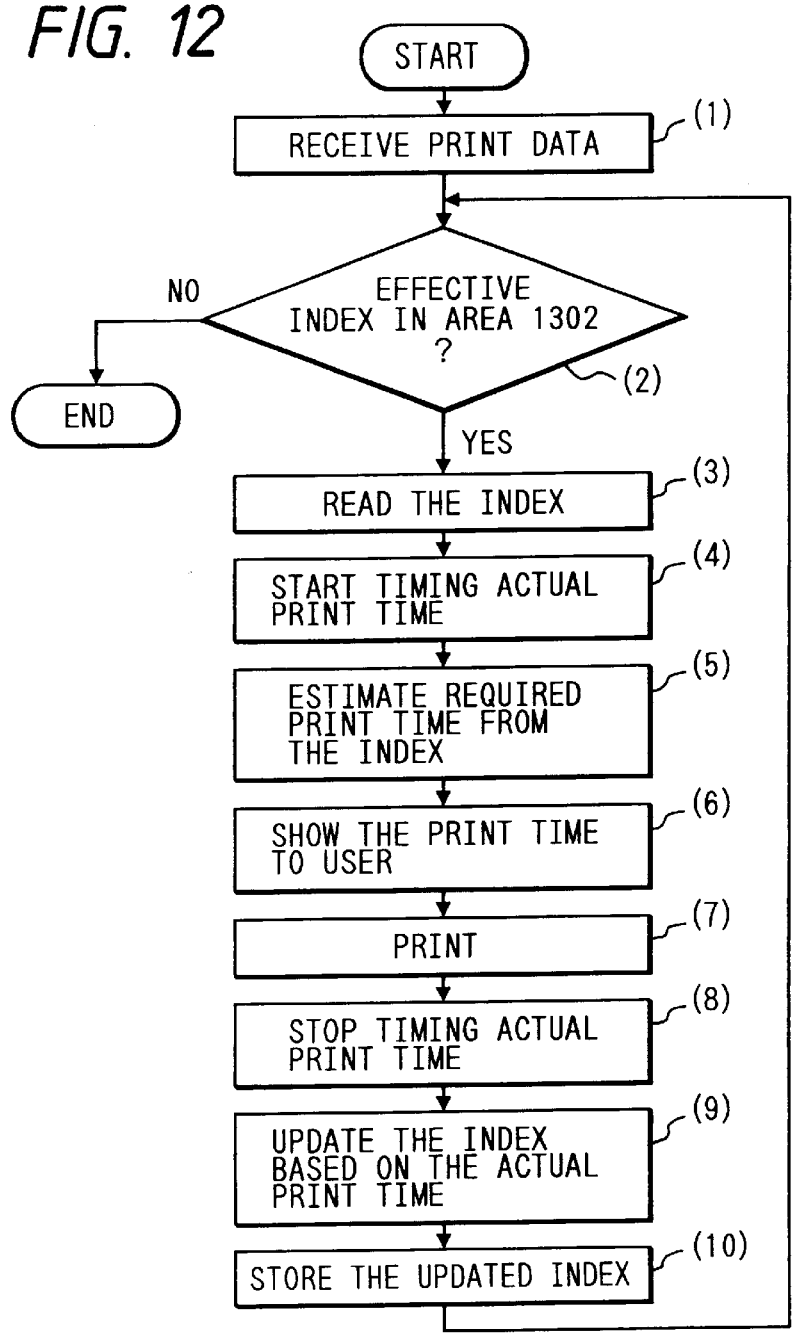
FIG. 12 shows a flow chart of another example of process for presenting the time relating to the print operation to a user by a print system in accordance with the second embodiment of the present invention.

FIG. 12 shows a flow chart of another example of the process for presenting the time relating to the print process to the user of the print system in the second embodiment of the present invention. Numerals (1) to (10) denote the respective steps. The print data structure corresponds to the data logical structure shown in FIG. 9.

When one printer 21 connected to the network 27 receives the print data file 1301 from one host computer 24 connected to the same network 27 (1), the printer 24 determines by the logical structure of FIG. 10 whether a valid index is present in the area 1302 in which the index of complexity of the print data to be printed on the first page (2). If the valid index is present, the index of complexity of the print data of that page is read from the area 1302 (3). Then, the printer 24 start to count the actual time required for the printing (4). Then, the printer 24 calculates the time required for the printing based on the index (5) and presents it to the user (6). Then, the printer 24 reads the print data of the print data file 1301 from the area 1303 in which the print data of that page is stored, and conducts the print process until the page end code 1304 appears (7). When the page end code 1304 appears, the printer 24 stops the counting (8), updates the index of complexity based on the actual print time (9) and stores it (10). Then, the process returns to the step (2) to determine whether a valid index is present in the area 1302 in which the index of complexity of the print data to be printed on the page following to the page end code 1304 is stored (2). If it is present, the process is continued and if it is not present, the process is terminated.

The process shown in FIG. 11 and the process shown in FIG. 12 are not exclusive but both may be executed in combination so that more information may be presented on the time to complete the printing to the user of the print system.

In the twelfth aspect of the present invention, the evaluation means is provided in each of the host computers for comparing the required record time calculated by the operation means provided in the host computer with the actually required print time to reevaluate the conversion value, and memory means is provided in each of the host computers for storing the conversion value reevaluated by the evaluation means.

The process for providing the evaluation means for reevaluating the conversion value to present the time relating to the print process to the user of the computer in the second embodiment of the present invention is now explained.

Figure 14:
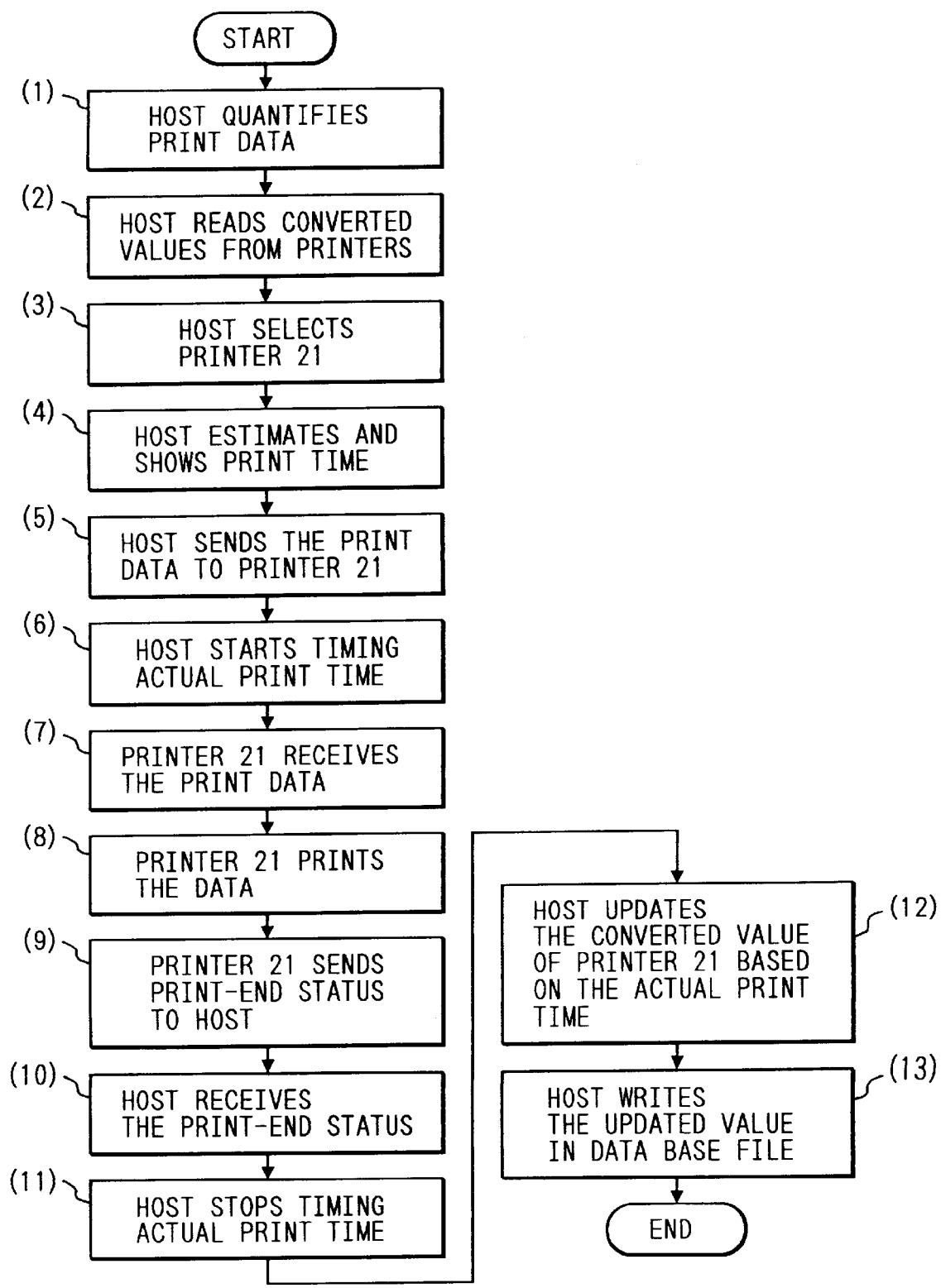
FIG. 14 shows a flow chart of other example of process for presenting the time relating to the print operation to a user by the print system in accordance with the second embodiment of the present invention.

FIG. 14 shows a flow chart of the process for presenting the time relating to the print process to the user of the print system in the second embodiment of the present invention. Numerals (1) to (13) denote the respective steps and the print data structure corresponds to the data logical structure shown in FIG. 7.

When one host computer 24 connected to the network 27 receives the print data, the host computer 24 quantifies the print data (1). Then, the host computer 24 reads the conversion value of the printer from the file logically structured to permit the reading of the conversion value of any printer for each printer, provided on the host computer (2). This file is referred to as a conversion value database. Then, the host computer 24 determines the printer to be used (3) by selecting, for example, a printer having the largest conversion value and the highest processing capability. In the present embodiment, it is assumed that the printer 21 is selected. Then, the host computer 24 calculates the print time by means of the operation means and presents it on the screen (4). Then, the host computer 24 transmits the print data to the printer 21 (5). Then, the host computer 24 starts to count (6). Then, the printer 24 receives the print data (7). Then, the printer 21 conducts the print process (8) and when the print process is completed, it sends a print end status through the network 27 to inform the end of print to the host computer 24 (9). The host computer 24 receives the print end status (10) and stops the counting (11). Then, the host computer 24 updates the conversion value of the printer 21 based on the time required for the printing (12) and writes the updated conversion value into the conversion value database file (13). At the next print process, the updated and stored conversion value is used.

[Third Embodiment]

In the above embodiment, the present invention is implemented in the printer system comprising a plurality of host computers and a plurality of printers. A print system configuration comprising a single host computer and a single printer is now discussed.

Figure 13:
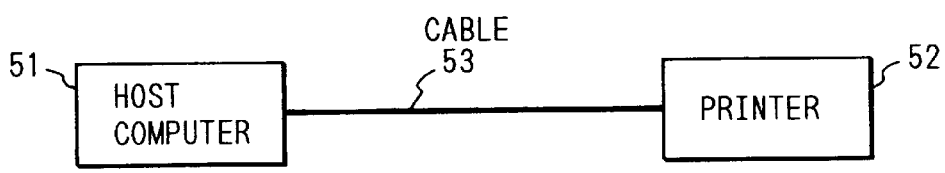
FIG. 13 shows a block diagram of a configuration of the print system in accordance with a third embodiment of the present invention.

FIG. 13 shows a block diagram of a configuration of the print system in accordance with the third embodiment of the present invention.

In FIG. 13, numeral 51 denotes a host computer, numeral 52 denotes a printer and they are connected by a cable 53.

In accordance with a thirteenth object of the present invention, there is provided a print system having printers and host computers connected in 1-to-1 fashion or n-to-1 fashion, comprising quantifying means provided in each of the host computers for analyzing print data to be printed to quantify the print data to an index indicating complexity, output means provided in each of the host computers for adding the index quantified by the quantifying means to the print data and outputting the print data to the printers, operation means provided in each of the printers for converting the index added to the print data outputted from the output means to a required record time based on a pre-registered conversion value, and presentation means provided in each of the printers for presenting the required record time converted by the operation means.

In accordance with the thirteenth aspect of the present invention, there is provided the print system having the printer 52 and host computer 51 connected in 1-to-1 fashion or n-to-1 fashion, comprising quantifying means (by the CPU in the host computer 51) provided in each of the host computers for analyzing print data to be printed to quantify the print data to an index indicating complexity, output means (the communication function of the host computer) provided in each of the host computers for adding the index quantified by the quantifying means to the print data and outputting the print data to the printer 52, operation means provided (the function of the controller of the printer 52) in each of the printers 52 for converting the index added to the print data outputted from the output means to a required record time based on a pre-registered conversion value, and presentation means provided in each of the printers for presenting the required record time converted by the operation means. The quantifying means on the host computer analyzes the print data to be printed and quantifies it to the index representing the complexity, the output means adds the quantified index to the print data and outputs it to the printer, the operation means on the printer converts the index added to the print data outputted from the output means to the required record time based on the pre-registered conversion value, the presentation means presents the converted required record time. Thus, in the print system having the printers and the host computers in the 1-to-1 or 1-to-n fashion, the required record time of the connected printer is calculated and informed to the user.

Features of the present embodiment are now discussed. In the print system shown in the present embodiment, the following function steps in the first and second embodiments are changed but all other steps are identical.

In the presentation process conducted in the step (4) shown in FIG. 8 in the first embodiment, the step (5) shown in FIG. 11 in the second embodiment and the step (6) shown in FIG. 12, because of the different configuration of the devices connected, the process by using the devices other than the host computer 51 and the printer 52 is conducted either by using the display such as the liquid crystal display or the LED provided on the printer 52 or by transmitting the numeric data to the host computer 51 and displaying it on the display device of the host computer.

Similarly, in the calculation process conducted by the step (3) shown in FIG. 8 in the first embodiment, the step (4)

shown in FIG. 10, the step (4) shown in FIG. 11 and the step (5) shown in FIG. 12, because of the different configuration of the devices connected, the process by using the devices other than the host computer 51 and the printer 52 is conducted by the printer 52 instead of the above process or by transmitting the numeric data to the host computer 51 to conduct it on the host computer.

As described above, even if the number of host computers or printers connected changes, the time required for the print process may be presented to the user with only the limitation imposed on the realization of the process relating to the number of host computers or printers.

In the above embodiment, the print system transfers the print data to the printers 24 to 26 designated by the independent host computers 21 to 23 on the network 27. The present invention is equally applicable to a print system in which a print server which may access a memory medium such as a hard disk (HD) or a magneto-optical disk may be provided on the network and the print data of the host computers 21 to 23 may be spooled for processing. The print server may reads the conversion values of the printers 24 to 26 and stores them, and when it receives the print data from the host computers 21 to 23, the print server may present the converted time required for the print process to each host printer or the host computer which is to output the print data.

The present invention may be applicable to either the system comprising a plurality of devices or the system comprising a single device. The present invention is also applicable to the system or apparatus which is implemented by supplying a program thereto.

What is claimed is:

1. A print system having a plurality of printers and a plurality of host computers connected to permit communication on a network, wherein each of said host computers comprises:

quantifying means for determining an attribute of each draw object of print data to be printed and analyzing the print data for each attribute to quantify the print data to a predetermined index indicating complexity of the print data; and transmission means for adding the index quantified by said quantifying means to the print data and transmitting the print data with the added index to one of said printers through the network, and wherein each of said printers comprises:

operation means for converting the index added to the print data transmitted by said transmission means to information indicating a required record time based on a pre-registered conversion value inherent in the respective printer: and presentation means for presenting the information converted by said operation means.

2. A print system according to claim 1, wherein said quantifying means determines the presence or absence of access to an external storage upon determining the attribute of the draw object of the print data to be printed and quantifies the print data to the index for each determined attribute of the draw object.

3. A print system according to claim 1, wherein said quantifying means determines an area process state to the print data upon determining the attribute of the draw object of the print data to be printed and quantifies the print data to the index for each determined attribute of the draw object.

4. A print system according to claim 1, further comprising evaluation means for comparing the required record time indicated by the information converted by said operation means with an actually required print time to reevaluate the conversion value and memory means for storing the conversion value reevaluated by said evaluation means.

5. A print system according to claim 4, wherein said memory means comprises a non-volatile memory.

6. A print system according to claim 2, wherein the attribute of the draw object is one of character, bit map, image and graphic representation.

7. A print system according to claim 3, wherein the attribute of the draw object is one of character, bit map, image and graphic representation.

8. A print system according to claim 2, wherein the print data includes one of character, bit map, image and graphic representation or a combination thereof as the draw object.

9. A print system according to claim 3, wherein the print data includes one of character, bit map, image and graphic representation or a combination thereof as the draw object.

10. A print system according to claim 1, wherein the required record time represents a time until the print data has been completely recorded.

11. A print system according to claim 4, wherein the required record time represents a time until the print data has been completely recorded.

12. A print system having a plurality of printers and a plurality of host computers connected to permit communication on a network, wherein each of said host computers comprises:

quantifying means for determining an attribute of each draw object of print data to be printed and analyzing the print data for each attribute to quantify the print data to a predetermined index indicating complexity of the print data; and transmission means for adding the index quantified by said quantifying means to the print data and transmitting the print data with the added index to one of said printers through the network, and wherein each of said printers comprises:

operation means for converting the index added to the print data transmitted by said transmission means to information indicating a required record time based on a pre-registered conversion value inherent in the respective printer; and presentation means for presenting, through the network, the information converted by said operation means to one of said host computers which transmitted the print data.

13. A print system according to claim 12, wherein said quantifying means determines the presence or absence of access to an external storage upon determining the attribute of the draw object of the print data to be printed and quantifies the print data to the index for each determined attribute of the draw object.

14. A print system according to claim 12, wherein said quantifying means determines an area process state to the print data upon determining the attribute of the draw object of the print data to be printed and quantifies the print data to the index for each determined attribute of the draw object.

15. A print system according to claim 12, further comprising evaluation means for comparing the required record time indicated by the information converted by said operation means with an actually required print time to reevaluate the conversion value and memory means for storing the conversion value reevaluated by said evaluation means.

16. A print system according to claim 15, wherein said memory means comprises a non-volatile memory.

17. A print system according to claim 13, wherein the attribute of the draw object is one of character, bit map, image and graphic representation.

18. A print system according to claim 14, wherein the attribute of the draw object is one of character, bit map, image and graphic representation.

19. A print system according to claim 13, wherein the print data includes one of character, bit map, image and graphic representation or a combination thereof as the draw object.

20. A print system according to claim 14, wherein the print data includes one of character, bit map, image and graphic representation on a combination thereof as the draw object.

21. A print system according to claim 12, wherein the required record time represents a time until the print data has been completely recorded.

22. A print system having a plurality of printers and a plurality of host computers connected to permit communication on a network, wherein each of said host computers comprises:

quantifying means for analyzing print data to be printed, page by page to quantity the print data to a predetermined index indicating complexity of the print data page by page; and transmission means for adding the index quantified, page by page, by said quantifying means to the print data- and transmitting the print data to one of said printers through the networks, and wherein each of said printers comprises:

operation means for converting the index added to the print data, page by page, transmitted by said transmission means to a required record time, page by page, based on a pre-registered conversion value inherent in the respective printer: and presentation means for presenting the required record time, page by page or in total, converted by said operation means.

23. A print system according to claim 22, wherein the required record time represents a time until the print data has been completely recorded.

24. A print system according to claim 22, wherein said quantifying means determines the presence or absence of access to an external storage upon determining the attribute of the draw object of the print data to be printed and quantifies the print data to the index for each determined attribute of the draw object.

25. A print system according to claim 24, wherein the attribute of the draw object is one of character, bit map, image and graphic representation.

26. A print system according to claim 24, wherein the print data includes one of character, bit map, image and graphic representation or a combination thereof as the draw object.

27. A print system according to claim 22, wherein said quantifying means determines an area process state to the print data upon determining the attribute of the draw object of the print data to be printed and quantifies the print data to the index for each determined attribute of the draw object.

28. A print system according to claim 27, wherein the attribute of the draw object is one of character, bit map, image and graphic representation.

29. A print system according to claim 27, wherein the print data includes one of character, bit map, image and graphic representation or a combination thereof as the draw object.

30. A print system according to claim 22, further comprising evaluation means for comparing the required record time indicated by the information converted by said operation means with an actually required print time to reevaluate the conversion value and memory means for storing the conversion value reevaluated by said evaluation means.

31. A print system according to claim 30, wherein said memory means comprises a non-volatile memory.

32. A print system having a plurality of printers and a plurality of host computers connected to permit communication on a network, wherein each of said host computers comprises:

quantifying means for determining attributes of drawing objects of print data to be printed and analyzing the print data for each attribute to quantify the print data to a predetermined index indicating complexity of the print data; and operation means for converting the index quantified by said quantifying means into a required record time of the print data in accordance with conversion values inherent in respective printers, wherein the required record time converted by said operation means is presented on presentation means provided in each of said host commuters, or transmitted to at least one of said printers where actual printing of the print data is to be performed and presented on presentation means provided in each of said printers.

33. A print system according to claim 32, wherein each of said host computers further comprises evaluation means for comparing the required record time converted by said operation means with an actually required print time to reevaluate the conversion value, and memory means for storing the conversion value reevaluated by said evaluation means.

34. A print system according to claim 32, wherein the required record time represents a time until the print data has been completely recorded.

35. A print system according to claim 32, wherein said quantifying means determines the presence or absence of access to an external storage upon determining the attribute of the draw object of the print data to be printed and quantifies the print data to the index for each determined attribute of the draw object.

36. A print system according to claim 35, wherein the attribute of the draw object is one of character, bit map, image and graphic representation.

37. A print system according to claim 35, wherein the print data includes one of character, bit map, image and graphic representation or a combination thereof as the draw object.

38. A print system according to claim 32, wherein said quantifying means determines an area process state to the print data upon determining the attribute of the draw object of the print data to be printed and quantifies the print data to the index for each determined attribute of the draw object.

39. A print system according to claim 38, wherein the attribute of the draw object is one of character, bit map, image and graphic representation.

40. A print system according to claim 38, wherein the print data includes one of character, bit map, image and graphic representation or a combination thereof as the draw object.

41. A print system according to claim 32, further comprising evaluation means for comparing the required record time indicated by the information converted by said operation means with an actually required print time to reevaluate the conversion value and memory means for storing the conversion value reevaluated by said evaluation means.

42. A print system according to claim 41, wherein said memory means comprises a non-volatile memory.

43. A print system according to claim 33, wherein the required record time represents a time until the print data has been completely recorded.

44. A print system having at least one printer and one host computer, wherein said host computer comprises:

quantifying means for determining attributes of drawing objects of print data to be printed and analyzing the print data for each attribute to quantify the print data to a predetermined index indicating complexity of the print data; and output means for adding the index quantified by said quantifying means to the print data and outputting the print data to said one printer or said plurality of printers, and wherein each of said at least one printer comprises:

operation means for converting the index added to the print data outputted by said output means to a required record time based on a preregistered conversion value inherent in the respective printer; and presentation means for presenting the required record time converted by said operation means.

45. A print system according to claim 44, wherein the required record time represents a time until the print data has been completely recorded.

46. A print system according to claim 44, wherein said quantifying means determines the presence or absence of access to an external storage upon determining the attribute of the draw object of the print data to be printed and quantifies the print data to the index for each determined attribute of the draw object.

47. A print system according to claim 46, wherein the attribute of the draw object is one of character, bit map, image and graphic representation.

48. A print system according to claim 46, wherein the print data includes one of character, bit map, image and graphic representation or a combination thereof as the draw object.

49. A print system according to claim 44, wherein said quantifying means determines an area process state to the print data upon determining the attribute of the draw object of the print data to be printed and quantifies the print data to the index for each determined attribute of the draw object.

50. A print system according to claim 49, wherein the attribute of the draw object is one of character, bit map, image and graphic representation.

51. A print system according to claim 49, wherein the print data includes one of character, bit map, image and graphic representation or a combination thereof as the draw object.

52. A print system according to claim 44, further comprising evaluation means for comparing the required record time indicated by the information converted by said operation means with an actually required print time to reevaluate the conversion value and memory means for storing the conversion value reevaluated by said evaluation means.

53. A print system according to claim 52, wherein said memory means comprises a non-volatile memory.

54. A method for presenting a required record time in a print system having a plurality of printers and a plurality of host computers connected to permit communication on a network, comprising the steps of:

determining attributes of drawing objects of print data to be printed and analyzing the print data for each attribute to quantify the print data to a predetermined index indicating complexity of the print data;

adding the quantified index to the print data and converting the added index to a required record time based on a pre-registered conversion value inherent in the respective printer; and presenting the converted required record time.

55. A print system according to claim 54, wherein the required record time represents a time until the print data has been completely recorded.

56. A print system according to claim 54, wherein said quantifying means determines the presence or absence of access to an external storage upon determining the attribute of the draw object of the print data to be printed and quantifies the print data to the index for each determined attribute of the draw object.

57. A print system according to claim 56, wherein the attribute of the draw object is one of character, bit map, image and graphic representation.

58. A print system according to claim 56, wherein the print data includes one of character, bit map, image and graphic representation or a combination thereof as the draw object.

59. A print system according to claim 54, wherein said quantifying means determines an area process state to the print data upon determining the attribute of the draw object of the print data to be printed and quantifies the print data to the index for each determined attribute of the draw object.

60. A print system according to claim 59, wherein the attribute of the draw object is one of character, bit map, image and graphic representation.

61. A print system according to claim 59, wherein the print data includes one of character, bit map, image and graphic representation or a combination thereof as the draw object.

62. A print system according to claim 54, further comprising evaluation means for comparing the required record time indicated by the information converted by said operation means with an actually required print time to reevaluate the conversion value and memory means for storing the conversion value reevaluated by said evaluation means.

63. A print system according to claim 62, wherein said memory means comprises a non-volatile memory.

64. An information processing apparatus comprising:

quantifying means for determining attributes of drawing objects of print data to be printed and analyzing the print data for each attribute to quantify the print data to a predetermined index indicating complexity of the print data;

transmission means for adding the index quantified by said quantifying means to the print data and transmitting the print data to an external print apparatus where a required record time is derived by operating on the added index in combination with a pre-registered conversion value inherent in the print apparatus;

receiving means for receiving the required record time from the external print apparatus; and presentation means for presenting the required record time received by said receiving means.

65. An apparatus according to claim 64, wherein said quantifying means determines the presence or absence of access to an external storage upon determining the attribute of the draw object of the print data to be printed and quantifies the print data to the index for each determined attribute of the draw object.

66. An apparatus according to claim 65, wherein the attribute of the draw object is one of character, bit map, image and graphic representation.

67. An apparatus according to claim 65, wherein the print data includes one of character, bit map, image and graphic representation or a combination thereof as the draw object.

68. An apparatus according to claim 64, wherein said quantifying means determines an area process state to the print data upon determining the attribute of the draw object of the print data to be printed and quantifies the print data to the index for each determined attribute of the draw object.

69. An apparatus according to claim 68, wherein the attribute of the draw object is one of character, bit map, image and graphic representation.

70. An apparatus according to claim 68, wherein the print data includes one of character, bit map, image and graphic representation or a combination thereof as the draw object.

71. An apparatus according to claim 64, further comprising evaluation means for comparing the required record time indicated by the information converted by said operation means with an actually required print time to reevaluate the conversion value and memory means for storing the conversion value reevaluated by said evaluation means.

72. An apparatus according to claim 71, wherein said memory means comprises a non-volatile memory.

73. An information processing apparatus comprising:

quantifying means for determining attributes of drawing objects of print data to be printed and analyzing the print data for each attribute to quantify the print data to a predetermined index indicating complexity of the print data;

memory means for storing conversion values inherent in respective external print apparatuses; and conversion means for converting the index quantified by said quantifying means into a required record time of the print data by the external print apparatuses using the respective conversion values stored in said memory means.

74. An apparatus according to claim 73, wherein said quantifying means determines the presence or absence of access to an external storage upon determining the attribute of the draw object of the print data to be printed and quantifies the print data to the index for each determined attribute of the draw object.

75. An apparatus according to claim 73, wherein the attribute of the draw object is one of character, bit map, image and graphic representation.

76. An apparatus according to claim 73, wherein the print data includes one of character, bit map, image and graphic representation or a combination thereof as the draw object.

77. An apparatus according to claim 73, wherein said quantifying means determines an area process state to the print data upon determining the attribute of the draw object of the print data to be printed and quantifies the print data to the index for each determined attribute of the draw object.

78. An apparatus according to claim 77, wherein the attribute of the draw object is one of character, bit map, image and graphic representation.

79. An apparatus according to claim 77, wherein the print data includes one of character, bit map, image and graphic representation or a combination thereof as the draw object.

80. An apparatus according to claim 73, further comprising evaluation means for comparing the required record time indicated by the information converted by said operation means with an actually required print time to reevaluate the conversion value and memory means for storing the conversion value reevaluated by said evaluation means.

81. An apparatus according to claim 80, wherein said memory means comprises a non-volatile memory.

82. A print apparatus comprising:

receiving means for receiving from an external apparatus print data and a predetermined index added to the print data, the index being derived by quantifying complexity of the print data:

converting the index received by said receiving means into a required record time of the print data in accordance with a pre-registered conversion value inherent in said print apparatus; and presentation means for presenting the required record time converted by said converting means.

83. A print apparatus according to claim 82, wherein said quantifying means determines the presence or absence of access to an external storage upon determining the attribute of the draw object of the print data to be printed and quantifies the print data to the index for each determined attribute of the draw object.

84. A print apparatus according to claim 83, wherein the attribute of the draw object is one of character, bit map, image and graphic representation.

85. A print apparatus according to claim 83, wherein the print data includes one of character, bit map, image and graphic representation or a combination thereof as the draw object.

86. A print apparatus according to claim 82, wherein said quantifying means determines an area process state to the print data upon determining the attribute of the draw object of the print data to be printed and quantifies the print data to the index for each determined attribute of the draw object.

87. A print apparatus according to claim 86, wherein the attribute of the draw object is one of character, bit map, image and graphic representation.

88. A print apparatus according to claim 86, wherein the print data includes one of character, bit map, image and graphic representation or a combination thereof as the draw object.

89. A print apparatus according to claim 83, further comprising evaluation means for comparing the required record time indicated by the information converted by said operation means with an actually required print time to reevaluate the conversion value and memory means for storing the conversion value reevaluated by said evaluation means.

90. A print apparatus according to claim 89, wherein said memory means comprises a non-volatile memory.

91. A print apparatus comprising:

receiving means for receiving from an external apparatus print data and a predetermined index added to the print data, the index being derived by quantifying complexity of the print data;

converting the index received by said receiving means into a required record time of the print data In accordance with a pre-registered conversion value inherent in said print apparatus; and transmission means for transmitting the required record time converted by said converting means to the external apparatus.

92. A print apparatus according to claim 91, wherein said quantifying means determines the presence or absence of access to an external storage upon determining the attribute of the draw object of the print data to be printed and quantifies the print data to the index for each determined attribute of the draw object.

93. A print apparatus according to claim 92, wherein the attribute of the draw object is one of character, bit map, image and graphic representation.

94. A print apparatus according to claim 92, wherein the print data includes one of character, bit map, image and graphic representation or a combination thereof as the draw object.

95. A print apparatus according to claim 91, wherein said quantifying means determines an area process state to the print data upon determining the attribute of the draw object of the print data to be printed and quantifies the print data to the index for each determined attribute of the draw object.

96. A print apparatus according to claim 95, wherein the attribute of the draw object is one of character, bit map, image and graphic representation.

97. A print apparatus according to claim 95, wherein the print data includes one of character, bit map, image and graphic representation or a combination thereof as the draw object.

98. A print apparatus according to claim 91, further comprising evaluation means for comparing the required record time indicated by the information converted by said operation means with an actually required print time to reevaluate the conversion value and memory means for storing the conversion value reevaluated by said evaluation means.

99. A print apparatus according to claim 98, wherein said memory means comprises a non-volatile memory.

100. A computer readable memory medium for storing a computer program comprising the steps of:
   determining attributes of drawing objects of print data to be printed and analyzing the print data for each attribute to quantify the print data to a predetermined index indicating complexity of the print data;
   adding the quantified index to the print data and converting the added index to a required record time based on a pre-registered conversion value inherent in a print apparatus intended to print the print data; and
   presenting the converted required record time.

101. A medium according to claim 100, wherein said determining step determines the presence or absence of access to an external storage upon determining the attribute of the draw object of the print data to be printed and quantifies the print data to the index for each determined attribute of the draw object.

102. A medium according to claim 101, wherein the attribute of the draw object is one of character, bit map, image and graphic representation.

103. A medium according to claim 101, wherein the print data includes one of character, bit map, image and graphic representation or a combination thereof as the draw object.

104. A medium according to claim 100, wherein said determining step determines an area process state to the print data upon determining the attribute of the draw object of the print data to be printed and quantifies the print data to the index for each determined attribute of the draw object.

105. A medium according to claim 104, wherein the attribute of the draw object is one of character, bit map, image and graphic representation.

106. A medium according to claim 104, wherein the print data includes one of character, bit map, image and graphic representation or a combination thereof as the draw object.

107. A medium according to claim 100, further comprising an evaluation step of comparing the required record time indicated by the converted information with an actually required print time to reevaluate the conversion value and memory means for storing the reevaluated conversion value.

108. A medium according to claim 107, wherein the memory means comprises a non-volatile memory.

* * * * *

UNITED STATES PATENT AND TRADEMARK OFFICE
CERTIFICATE OF CORRECTION

PATENT NO. : 6,132,116
DATED : October 17, 2000
INVENTOR(S) : NAOHIRO YOSHIKAWA

It is certified that error appears in the above-identified patent and that said Letters Patent is hereby corrected as shown below:

ON THE TITLE PAGE
Item

[*] NOTICE

Insert: --[*] NOTICE: This patent issued on a continued prosecution application filed under 37 CFR 1.53(d), and is subject to the twenty year patent term provisions of 35 U.S.C. 154(a)(2).--.

COLUMN 1

Line 20, "other" should read --another--.
Line 21, "share" should read --shares--.
Line 31, "other" should read --another--.

COLUMN 3

Line 54, "transmit" should read --transmits--.
Line 62, "index" should read --index of--.

COLUMN 5

Line 4, "quantifying" should read --quantifies--.

UNITED STATES PATENT AND TRADEMARK OFFICE
CERTIFICATE OF CORRECTION

PATENT NO. : 6,132,116
DATED : October 17, 2000
INVENTOR(S) : NAOHIRO YOSHIKAWA

It is certified that error appears in the above-identified patent and that said Letters Patent is hereby corrected as shown below:

COLUMN 6

Line 13, "other" should read --another--.
Line 28, "other" should read --another--.
Line 41, "denotes" should read --denote--.
Line 49, "denotes" should read --denote--.
Line 56, "throughput" should read --throughputs--.

COLUMN 9

Line 29, "transmit" should read --transmits--.
Line 37, "index" should read --index of--.

COLUMN 10

Line 18, "eights" should read --eighth--.

COLUMN 15

Line 62, "quantifying" should read --quantifies--.

COLUMN 16

Line 62, "which" should read --which is located--.
Line 65, "start" should read --starts--.

UNITED STATES PATENT AND TRADEMARK OFFICE
CERTIFICATE OF CORRECTION

PATENT NO. : 6,132,116
DATED : October 17, 2000
INVENTOR(S) : NAOHIRO YOSHIKAWA

It is certified that error appears in the above-identified patent and that said Letters Patent is hereby corrected as shown below:

COLUMN 19

Line 21, "may" should be deleted.

COLUMN 21

Line 24, "data-" should read --data--.

COLUMN 22

Line 20, "commuters" should read --computers--.

Signed and Sealed this

Twenty-ninth Day of May, 2001

Attest:

NICHOLAS P. GODICI

Attesting Officer

Acting Director of the United States Patent and Trademark Office